(12) United States Patent
Yakimenko et al.

(10) Patent No.: US 9,721,352 B1
(45) Date of Patent: *Aug. 1, 2017

(54) METHOD AND APPARATUS FOR COMPUTER VISION ANALYSIS OF CANNON-LAUNCHED ARTILLERY VIDEO

(71) Applicant: The United States of America, as represented by the Secretary of the Navy, Washington, DC (US)

(72) Inventors: Oleg A. Yakimenko, Seaside, CA (US); Mathias N. Kolsch, Carmel, CA (US); Ryan J. Decker, Hoboken, NJ (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 148 days.

This patent is subject to a terminal disclaimer.

(21) Appl. No.: 14/945,781

(22) Filed: Nov. 19, 2015

Related U.S. Application Data

(63) Continuation-in-part of application No. 14/555,798, filed on Nov. 28, 2014, now Pat. No. 9,563,964.

(60) Provisional application No. 61/910,711, filed on Dec. 2, 2013.

(51) Int. Cl.
| | |
|---|---|
| H04N 7/18 | (2006.01) |
| G06T 7/20 | (2017.01) |
| G06T 7/00 | (2017.01) |
| H04N 1/40 | (2006.01) |

(52) U.S. Cl.
CPC ......... *G06T 7/2033* (2013.01); *G06T 7/0085* (2013.01); *G06T 7/0097* (2013.01); *H04N 1/40012* (2013.01); *G06T 2207/10016* (2013.01); *G06T 2207/10024* (2013.01); *G06T 2207/30241* (2013.01)

(58) Field of Classification Search
CPC ........ F41G 3/16; F41G 3/142; G02B 27/0068
USPC .......................................... 348/135
See application file for complete search history.

(56) References Cited

U.S. PATENT DOCUMENTS

| | | | |
|---|---|---|---|
| 8,651,381 B2* | 2/2014 | Rudich | F41G 11/001 235/404 |
| 2009/0040308 A1* | 2/2009 | Temovskiy | F41G 3/16 348/158 |
| 2011/0297742 A1* | 12/2011 | Sullivan | F41G 3/142 235/407 |

* cited by examiner

*Primary Examiner* — Thai Tran
*Assistant Examiner* — Jose Mesa
(74) *Attorney, Agent, or Firm* — Naval Postgraduate School; James B. Potts; Lisa A. Norris

(57) ABSTRACT

Systems and methods are provided to quantify the pitching and yawing motion of a projectile during ballistic flight using two camera/tracker video systems. Image processing tools are used to segment the shape of the projectile in each frame of a launch video, which allows the location and observed pitch angle to be calculated with sub-pixel accuracy. Subsequent automated analysis uses the history of the projectile location and the pitching behavior to calculate estimates for the epicyclic motion, as well as other ballistic parameters such as aeroballistic coefficients. Using two cameras located at different orthographic views of the line-of-fire (LOF) allows the pitching and yawing motion history of the projectile to be calculated in three dimensions (3D). In addition, input of the camera locations, cannon trunnion location, and the cannon pointing direction allows for automatic correction for camera misalignment.

18 Claims, 19 Drawing Sheets

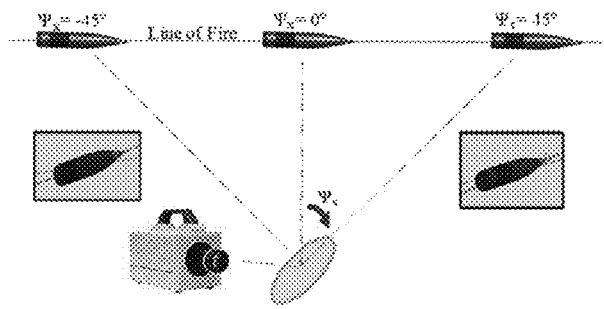 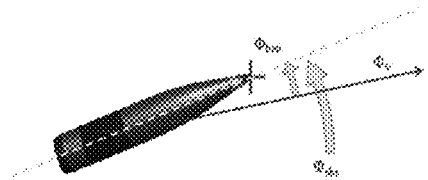
FIG. 14  FIG. 15
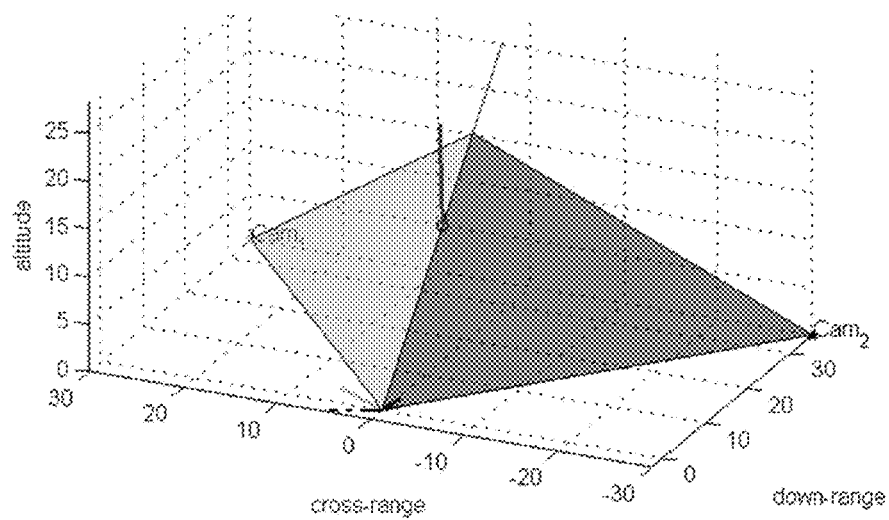
FIG. 16

| Pixels Along Length of Projectile | | 413 | | 341 | | 227 | | 112 | | 53 | |
|---|---|---|---|---|---|---|---|---|---|---|---|
| Scale Ratio (vs. Typical Real Video) | | 121% | | 100% | | 67% | | 33% | | 16% | |
| | True: ω (hz) | ω (hz) | % error | ω (hz) | % error | ω (hz) | % error | ω (hz) | % error | ω (hz) | % error |
| nutation ($ω_f$) | 0.63611 | 0.63603 | -0.013% | 0.63595 | -0.025% | 0.63622 | 0.017% | 0.63600 | -0.017% | 0.46770 | -26.475% |
| precession ($ω_s$) | 0.15000 | 0.15000 | 0.000% | 0.15002 | 0.013% | 0.14997 | -0.020% | 0.15006 | 0.040% | 0.00021 | -99.860% |

FIG. 17

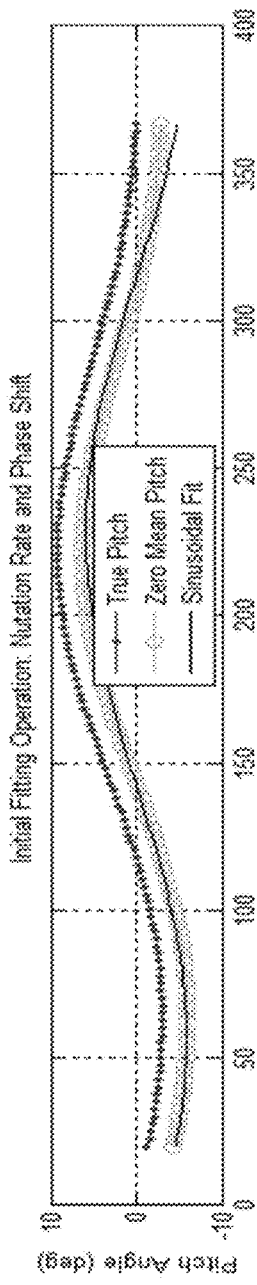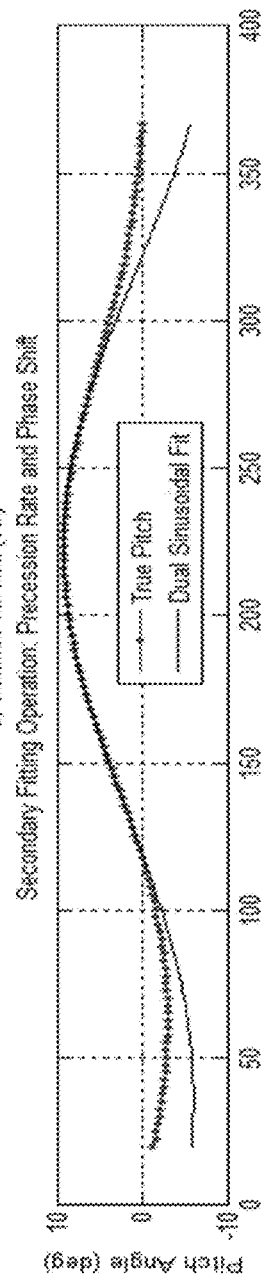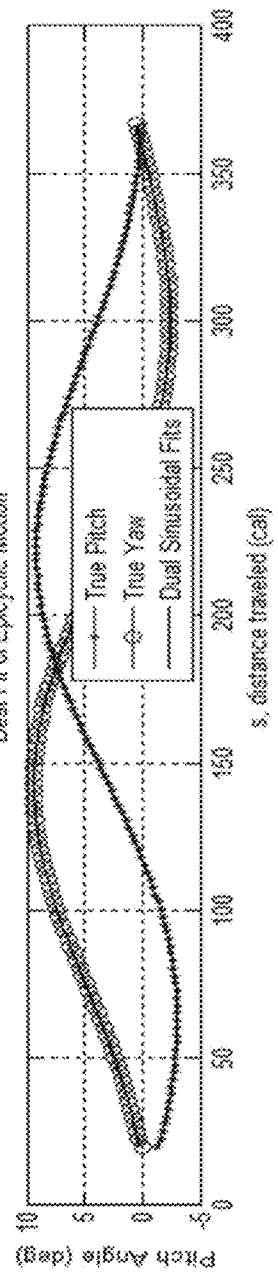

METHOD AND APPARATUS FOR COMPUTER VISION ANALYSIS OF CANNON-LAUNCHED ARTILLERY VIDEO

CROSS-REFERENCE TO RELATED APPLICATIONS

This application is a continuation-in-part application of U.S. application Ser. No. 14/555,798, filed Nov. 28, 2014, which claims the benefit of U.S. Provisional Application No. 61/910,711 filed Dec. 2, 2013, each of which is hereby incorporated in its entirety by reference.

INCORPORATION BY REFERENCE

[Reference 1] "FASTCAM SA5, Ultra High-Speed Video System." Photron USA, INC. San Diego, Calif., 2012;

[Reference 2] Trajectory Tracker User Manual. Specialised Imaging. 41690 Enterprise Circle North. Temecula, Calif., 92590;

[Reference 3] Itronix. "DRS's Flight Follower System." Specification Sheet. www.itronix.com/pdf/DRS_Flight_Follower.pdf. Accessed July, 2012;

[Reference 4] Davis, B., Guidos, B., and Harkins, T. "Complementary Roles of Spark Range and Onboard Free-Flight Measurements for Projectile Development." Army Research Laboratory Report No. ARL-TR-4910. August 2009;

[Reference 5] Guidos, B. "Aerodynamics of Denel 105 mm XM2019 Projectile Obtained from Spark Range Firings." Army Research Laboratory Report No. ARL-TR-5187, May 2010;

[Reference 6] "Use of Yaw Cards During Projectile Development." Arrow Tech Associates, Inc. Yaw Card White Paper, July 2010;

[Reference 7] Davis, B., Harkins, T., Hepner, D., Patton, B., and Hall, R., "Aeroballisitc Diagnostic Fuze (DFuze) Measurements for Projectile Development, Test, and Evaluation". Army Research Laboratories, Aberdeen Md. ARL-TR-3204, July 2004;

[Reference 8] Decker, R. J, Yakimenko, O. A., Hollis, M. S., and Sweeney, P. J. "On the Development of the Artillery Flight Characterization Electronics Rescue Kit." Proceedings of the 23$^{rd}$ Aerodynamic Decelerator Systems Conference. American Institute of Aeronautics and Astronautics, May 2011;

[Reference 9] "TrackEye Motion Analysis Software." Photo-Sonics, Inc. www.photosonics.com/trackeye_software.htm. Accessed July, 2012;

[Reference 10] Saroch, A. "Optical Character Recognition." MATLAB source code. The Mathworks Inc. May 20, 2012;

[Reference 11] Szeliski, R. Computer Vision: Algorithms and Applications. Springer, 2010;

[Reference 12] Canny, J. A Computational Approach to Edge Detection. IEEE Trans. Pattern Analysis and Machine Intelligence, Vol. 8(6), 1986, pp. 679-698;

[Reference 13] Cootes, T. F., Taylor, C. J., Cooper, D. H., and Graham, J. "Active Shape Models—Their Training and Application." Computer Vision and Understanding. Vol. 61, No. 1, January, 1995, pp. 38-59;

[Reference 14] McCoy, R. Modern Exterior Ballistics: The Launch and Flight Dynamics of Symmetric Projectiles, Schiffer Publishing, Atglen, P A, 1999;

[Reference 15] MATLAB. Version 7.12.0 (R2011a). Natick, Mass.: The MathWorks Inc., 2011;

[Reference 16] Carlucci, D., and Jacobson, S. Ballistics: Theory and Design of Guns and Ammunition, CRC Press, Boca Raton, Fla., 2008;

[Reference 17] Koenig, W. "M795 Aero." Armaments Research Development and Engineering Center. Unpublished Data, 2012;

[Reference 18] "Pitch and Yaw Report." Yuma Proving Ground, Data Reduction & Analysis Branch. Mission ID: 18SEP12. Unpublished Report, 2012;

[Reference 19] Tate, J. "Extraction of Aeroballistic Coefficients from Flight Follower data." Ballistic Engineering Consulting Limited, 2011;

[Reference 20] Hough, P. V. C., "Machine Analysis of Bubble Chamber Pictures. Proceedings of the International Conference of High Energy Accelerators and Instrumentation, 1959;

[Reference 21] Barnett, B., "Trajectory Equations for a Six-Degree-Of-Freedom Missile Using a Fixed-Plane Coordinate System," TR-3391, Picatinny Arsenal, Dover, N.J., June 1966;

[Reference 22] Driels, M. Weaponeering: Conventional Weapon System Effectiveness. AIAA, Reston, Va., 2004;

[Reference 23] Howell, B. E., Guidos, B., and Celmins, I. "Flight Stability of Rocket-Propelled Grenade Variants PG-7, 7L, 7M, 7S, and 7AT Obtained from Experiment Firings." Army Research Laboratory Report No. ARL-TR-4725, February 2009;

[Reference 24] Kolsch, M. Lecture Notes. Computer Science 4330, Computer Vision. Naval Postgraduate School. September, 2010;

[Reference 25] PRODAS. Version 3. Arrow Tech Associates. South Burlington, V T, 2012; and

[Reference 26] Yakimenko, O. Engineering Computations and Modeling in MATLAB/Simulink. AIAA, Reston, Va., 2011, are incorporated herein by reference in their entirety.

BACKGROUND OF THE PRESENT DISCLOSURE

1. Field of the Present Disclosure

The present disclosure generally relates to automatic determination of the pitch and the yaw of a launched projectile from recorded launch video taken of the projectile in flight.

2. Description of the Related Art

Live-fire testing of artillery projectiles is commonly conducted for design changes or lot-acceptance verification. In these tests, it is becoming increasingly common to record high-speed video of the projectiles as they exit the muzzle of the cannon. Often, these cameras are stationary digital cameras capable of recording up to 100,000 frames per second (fps). In some instances, when visual confirmation of the initial flight performance is desired, new state-of-the-art camera systems capable of automated rotating to follow a projectile are used.

Some of these camera systems utilize an optical system that works by rotating a mirror at a calculated rate, so that the projectile remains in the camera field of view for more than 100 m (meters) following muzzle exit. For example, a successful "track" of a 155 mm (millimeter)-type artillery projectile can deliver thousands of high-resolution digital images of the projectile during the first few moments of free-flight. Depending on the zoom and position of the camera, the resolution quality of these images can deliver hundreds of pixels along the length of the projectile. Analysis of this large amount of data can be difficult and time consuming, when trying to determine the position and motion of the projectile.

Manual analysis requires manual data reduction of stationary video system launch video in which an operator plays a launch video and identifies relative angles between the background and regions of the bullet to estimate position. Limitations of this type of analysis are that it is labor-intensive, limited to the precision of the image resolution, and it is subject to human error. In addition, a stationary field of view makes it difficult to measure the observed pitch angle in more than one location along the line of fire. Typically, pitch and yaw high speed cameras are pointed at an estimated location of the first-maximum yaw (FMY). This type of analysis requires precise knowledge of both the location and orientation of all cameras used.

More recent prior art methods utilize computer analysis of projectiles by tracking specific features on objects in artillery launch video. Results from different cameras can be combined to quantify 6 degrees-of-freedom (DOF) motion. Some limitations of this type of analysis are that it requires the operator to be trained in the specific program, and often requires user interaction to re-select tracked points several times during the video. These systems may not be practical if analyzing hundreds of video frames worth of data.

SUMMARY OF THE PRESENT DISCLOSURE

In accordance with one embodiment of the present disclosure, a computer-implemented method for analyzing a video taken of a projectile launched from a gun is provided. The method includes: receiving a first projectile launch video recording of a projectile launched from a gun generated by a first video camera system, the first projectile launch video having a plurality of first image frames, at least a portion of the plurality of first image frames containing an expected projectile shape; receiving a second projectile launch video recording of the projectile launched from the gun generated by a second video camera system, the second video camera system being positioned at a different location from the first video camera system, the second projectile launch video having a plurality of second image frames, at least a portion of the plurality of second image frames containing an expected projectile shape; generating a first pitch history by segmenting a projectile shape in each of the first image frames of the plurality of first image frames; generating a second pitch history by segmenting a projectile shape in each of the second image frames of the plurality of second image frames; generating a first corrected pitch history by receiving first mirror rotation data corresponding with the first projectile launch video, and recording and correcting the first pitch history for skew angle and camera misalignment; generating a second corrected pitch history by receiving second mirror rotation data corresponding with the second projectile launch video, and recording and correcting the second pitch history for skew angle and camera misalignment; receiving the first corrected pitch history and the second corrected pitch history and geodetic information associated with the location geometry of the first video camera system, the second video camera system, and the gun; and estimating the pitch and the yaw of the projectile based on the first corrected pitch history, the second corrected pitch history, and the geodetic information.

In accordance with another embodiment of the present disclosure, a system for analyzing a video taken of a projectile launched from a gun is provided. The system includes a receiving module configured to receive: a first projectile launch video recording of a projectile launched from a gun generated by a first video camera system, the first projectile launch video having a plurality of first image frames, at least a portion of the plurality of first image frames containing an expected projectile shape; a second projectile launch video recording of the projectile launched from the gun generated by a second video camera system, the second video camera system being positioned at a different location from the first video camera system, the second projectile launch video having a plurality of second image frames, at least a portion of the plurality of second image frames containing an expected projectile shape; and geodetic information associated with the location geometry of the first video camera system, the second video camera system, and the gun. A segmenting module is configured to segment a projectile shape in each of the first image frames of the plurality of first image frames to generate a first pitch history, and the second image frames of the plurality of second image frames to generate a second pitch history. A generating module is configured to generate: a first corrected pitch history by receiving first mirror rotation data corresponding with the first projectile launch video, and recording and correcting the first pitch history for skew angle and camera misalignment; and a second corrected pitch history by receiving second minor rotation data corresponding with the second projectile launch video, and recording and correcting the second pitch history for skew angle and camera misalignment. A pitch and yaw estimating module is configured to estimate the pitch and the yaw of the projectile based on the first corrected pitch history, the second corrected pitch history, and the geodetic information.

In accordance with another embodiment of the present disclosure, a system for analyzing a video taken of a projectile launched from a gun is provided. The system includes a receiving module configured to receive: a first projectile launch video recording of a projectile launched from a gun generated by a first video camera system, the first projectile launch video having a plurality of first image frames, at least a portion of the plurality of first image frames containing an expected projectile shape; a second projectile launch video recording of the projectile launched from the gun generated by a second video camera system, the second video camera system being positioned at a different location from the first video camera system, the second projectile launch video having a plurality of second image frames, at least a portion of the plurality of second image frames containing an expected projectile shape; and geodetic information associated with the location geometry of the first video camera system, the second video camera system, and the gun. A segmenting module is configured to segment a projectile shape in each of the first image frames of the plurality of first image frames to generate a first pitch history, and the second image frames of the plurality of second image frames to generate a second pitch history. The segmenting module is further configured to increase a sensitivity of at least one of the first projectile launch video and the second projectile launch video to find the projectile in the first or second projectile launch video. A generating module is configured to generate: a first corrected pitch history by receiving first mirror rotation data corresponding with the first projectile launch video, and recording and correcting the first pitch history for skew angle and camera misalignment; and a second corrected pitch history by receiving second mirror rotation data corresponding with the second projectile launch video, and recording and correcting the second pitch history for skew angle and camera misalignment. A pitch and yaw estimating module is configured to estimate the pitch and the yaw of the projectile based on the first corrected pitch history, the second corrected pitch history, and the geodetic information. A velocity calculating module is configured to calculate a velocity vector of the projectile from an orthogonal point and camera sweep plane of the first and second projectile launch videos. A correction module is configured to correct the pitch and yaw estimates with the velocity vector. A merging module is configured to merge the corrected pitch and yaw measurements from the first and second pitch histories and position estimates of the first and second cameras. An epicyclical motion calculating module is configured to determine an epicyclical motion of the projectile from the merged pitch and yaw measurements. An aeroballistic parameter calculating module is configured to determine an aeroballistic parameter from the epicyclical motion of the projectile.

Embodiments in accordance with the present disclosure are best understood by reference to the following detailed description when read in conjunction with the accompanying drawings.

BRIEF DESCRIPTION OF THE DRAWINGS

FIG. 1, illustrated in partial views

FIG. 3, illustrated in partial views

FIG. 4, illustrated in partial views

FIG. 14 illustrates observed pitch angle corrections.
FIG. 15 illustrates observed pitch angle corrections.
FIG. 16 illustrates launch geometry of quadrant elevation (QE)=45 degrees (800 mils).

FIG. 17 illustrates a table showing verification study results at different resolutions in accordance with one embodiment of the present disclosure.

FIG. 18 illustrates an initial fitting operation: nutation rate and phase shift in automatic quantification of epicyclic motion in accordance with one embodiment of the present disclosure.

FIG. 19 illustrates a secondary fitting operation: precession rate and phase shift in automatic quantification of epicyclic motion in accordance with one embodiment of the present disclosure.

FIG. 20 illustrates a resultant best fit of epicyclic motion in accordance with one embodiment of the present disclosure.

Embodiments in accordance with the present disclosure are further described herein with reference to the drawings.

DETAILED DESCRIPTION OF THE PRESENT DISCLOSURE

Generally viewed, the methods and systems described in accordance with the present disclosure provide an automated method to quantify the pitching and yawing motion of a projectile during ballistic flight using two trajectory tracking launch video camera systems. Image processing tools are used to segment the shape of the projectile in each frame of a launch video, which allows the location and observed pitch angle to be calculated with sub-pixel accuracy, with output of a determined pitch and yaw of the projectile. Subsequent automated analysis uses the history of the projectile location and the pitching behavior to calculate estimates for the epicyclic motion, as well as other ballistic parameters such as aeroballistic coefficients. Using two cameras located at different orthographic views of the line-of-fire (LOF) allows the pitching and yawing motion history of the projectile to be calculated in three dimensions (3D). In addition, input of the camera locations, cannon trunnion location, and the cannon pointing direction allow for automatic correction for camera misalignment. Herein the terms cannon and gun are used interchangeably to represent a device that launches the projectile into flight.

Figure 1A:
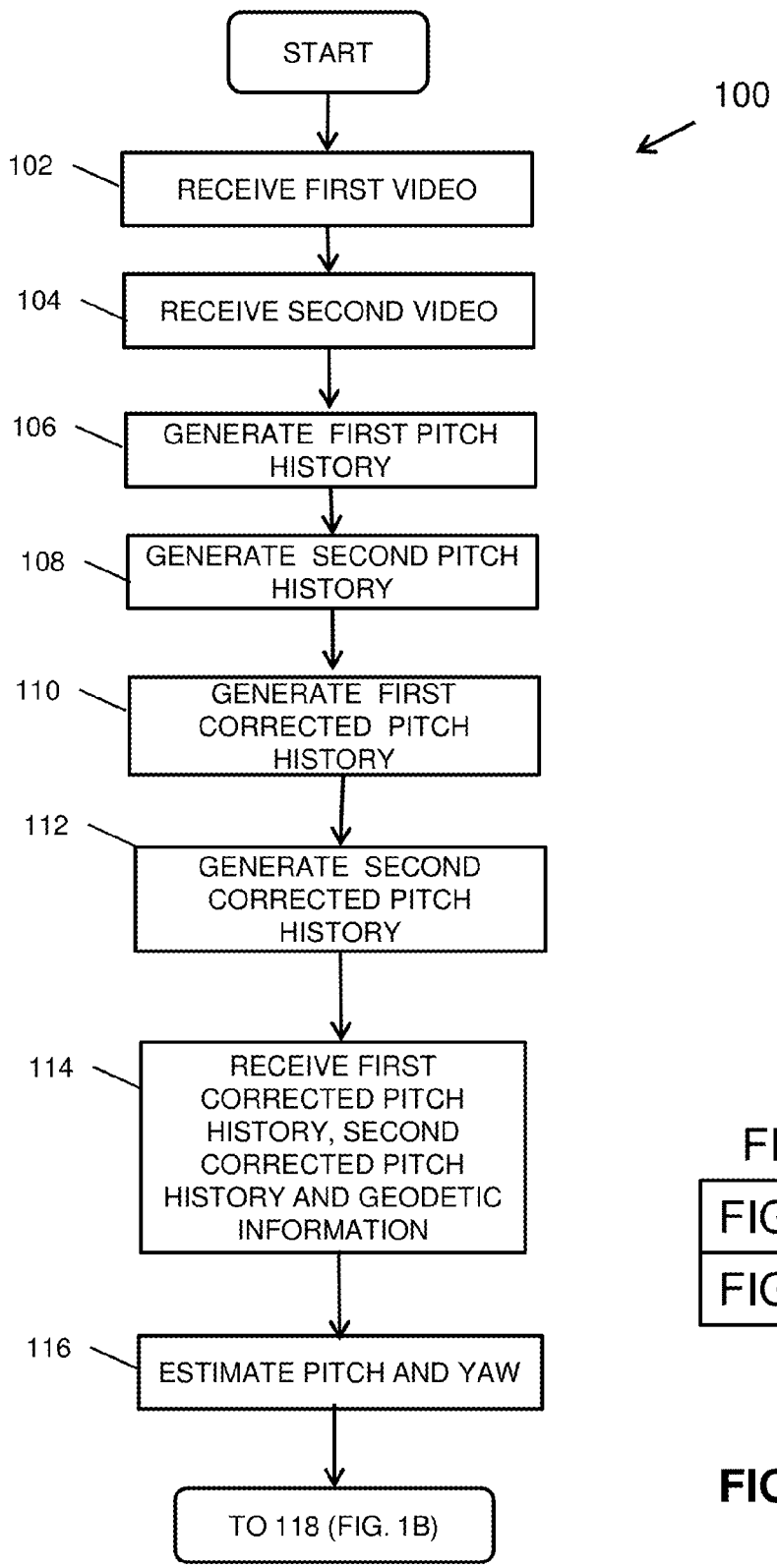
FIG. 1A and FIG. 1B, illustrates a process flow diagram of a method for analyzing a cannon-launched artillery video of a projectile launched from a gun in accordance with one embodiment of the present disclosure.
Figure 1B:
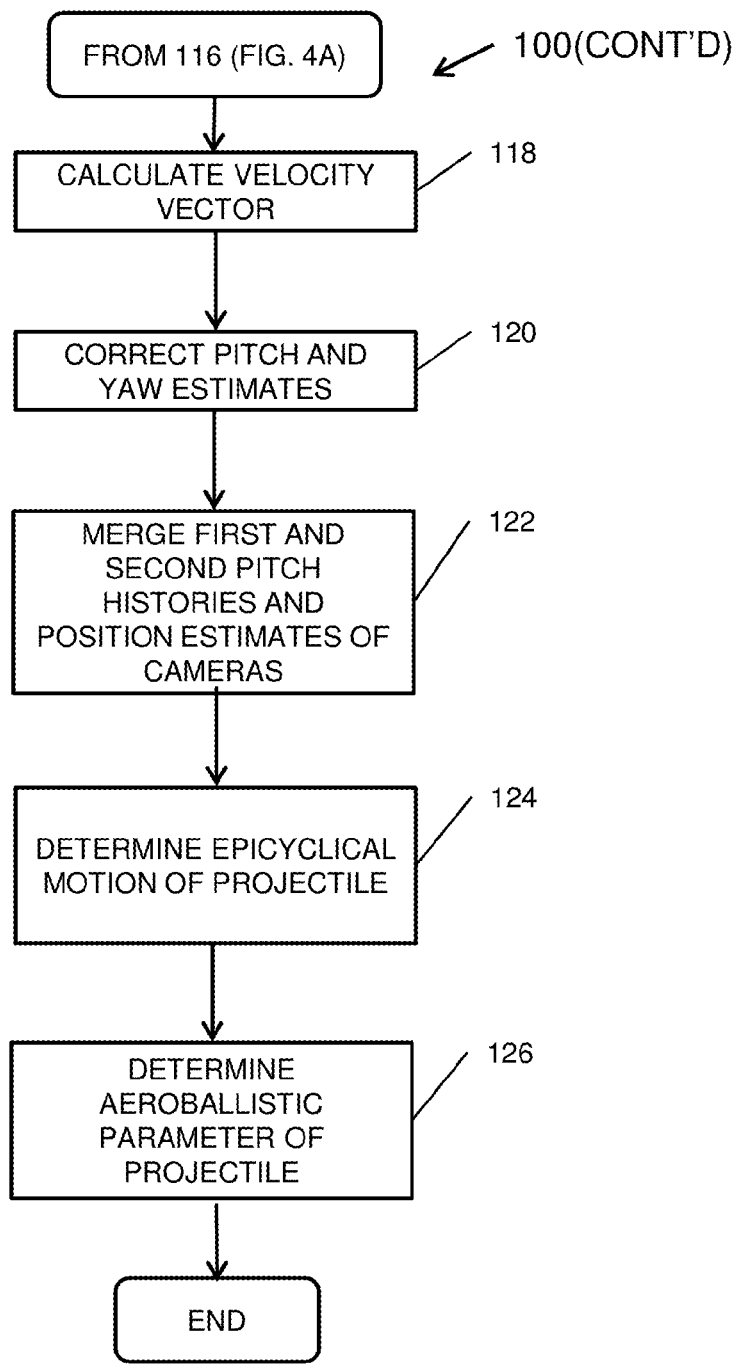

With reference to FIG. 1, shown is a flow diagram of a method 100 for analyzing a cannon-launched artillery video of a projectile launched from a gun according to an exemplary embodiment of this disclosure.

The method 100 includes: receiving a first projectile launch video recording of a projectile launched from a gun generated by a first video camera system 102; receiving a second projectile launch video recording of the projectile launched from the gun generated by a second video camera system, the second video camera system being positioned at a different location from the first video camera system 104; generating a first pitch history by segmenting a projectile shape, if any, in each of the first image frames of a plurality of first image frames 106; generating a second pitch history by segmenting a projectile shape, if any, in each of the second image frames of the plurality of second image frames 108; generating a first corrected pitch history by receiving first mirror rotation data corresponding with the first projectile launch video and recording and correcting the first pitch history for skew angle and camera misalignment 110; generating a second corrected pitch history by receiving second mirror rotation data corresponding with the second projectile launch video and recording and correcting the second pitch history for skew angle and camera misalignment 112; receiving the geodetic information associated with the location geometry of the first video camera system, the second video camera system, and the gun 114; estimating a pitch and a yaw of the projectile based on the first corrected pitch history, the second corrected pitch history, and the geodetic information 116; calculating a velocity vector of the projectile from an orthogonal point and camera sweep plane of the first and second projectile launch videos 118; correcting the pitch and yaw measurements from the velocity vector 120; merging the corrected pitch and yaw measurements from the first and second pitch histories and position estimates of the first and second cameras 122; determining an epicyclical motion of the projectile from the merged pitch and yaw measurements 124; and determining an aeroballistic parameter from the epicyclical motion of the projectile 126.

At 102, a first projectile launch video recording of a projectile launched from a gun generated by a first video camera system is received. The first projectile launch video has a plurality of first image frames. At least a portion of the plurality of first image frames contains an expected projectile shape.

At 104, a second projectile launch video recording of the projectile launched from the gun generated by a second video camera system is received. The second video camera system is positioned at a different location from the first video camera system. The second projectile launch video has a plurality of second image frames. At least a portion of the plurality of second image frames contains an expected projectile shape. It will be appreciated that the first and second launch videos can be received simultaneously or sequentially.

It will be appreciated that the first and second launch videos of the projectile can be obtained from each of two camera/tracker systems. During recording of a projectile launch, the camera/tracker systems each generate a recorded launch video and mirror rotation data associated with the video. For example, the recorded launch videos can be received in a digital format.

At 106, a first pitch history is generated. To do so, a projectile shape is segmented in each of the first image frames of a plurality of first image frames. From the segmented image frames, the first pitch history is generated. The segmentation process of the first image frames is described in more detail below.

At 108, a second pitch history is generated. To do so, a projectile shape is segmented in each of the second image frames of a plurality of second image frames. From the segmented image frames, the second pitch history is generated. The segmentation process of the second image frames is described in more detail below. It will be appreciated that the first and second launch image frames can be segmented simultaneously or sequentially.

It will be appreciated that the projectile segmentation process extracts information from each launch video such as the projectile location and orientation in each image frame, is extracted. For example, the first and second launch videos can be subject to the same segmentation process. During the segmentation process, an Active Shape Model (ASM) data is used in determining the projectile shape, as described in more detail below.

At 110, a first corrected pitch history is generated by receiving first minor rotation data corresponding with the first projectile launch video. The first minor rotation data is recorded and corrected for skew angle and camera misalignment to generate the first corrected pitch history. In one example, a translation movement of the projectile in the first projectile launch video can be corrected. In another example, the observed pitching angle relative to the horizontal axis of the frame ($\Phi_{obs}$) in the first projectile launch video can be corrected. In a further example, a pitch measurement for skew angle and camera misalignment in the first projectile launch video can be corrected. The generation of the first corrected pitch history is described in more detail below.

At 112, a second corrected pitch history is generated by receiving second mirror rotation data corresponding with the second projectile launch video. The second mirror rotation data is recorded and corrected for skew angle and camera misalignment to generate the second corrected pitch history. In one example, a translation movement of the projectile in the second projectile launch video can be corrected. In another example, the observed pitching angle relative to the horizontal axis of the frame ($\Phi_{obs}$) in the second projectile launch video can be corrected. In a further example, a pitch measurement for skew angle and camera misalignment in the first projectile launch video can be corrected. The generation of the second corrected pitch history is described in more detail below.

At 114, geodetic information associated with the location geometry of the first video camera system, the second video camera system, and the gun is received.

At 116, a pitch measurement and a yaw measurement of the projectile is estimated based on the first corrected pitch history, the second corrected pitch history, and the geodetic information, as described in more detail below.

At 118, a velocity vector of the projectile is calculated from an orthogonal point and camera sweep plane of the first and second projectile launch videos, as described in more detail below.

At 120, the pitch and yaw measurements are corrected using the velocity vector, as described in more detail below.

At 122, the corrected pitch and yaw measurements are merged from the first and second pitch histories and position estimates of the first and second cameras, as described in more detail below.

At 124, an epicyclical motion of the projectile is determined from the merged pitch and yaw measurements, as described in more detail below.

At 126, an aeroballistic parameter is determined from the epicyclical motion of the projectile, as described in more detail below.

Figure 2:
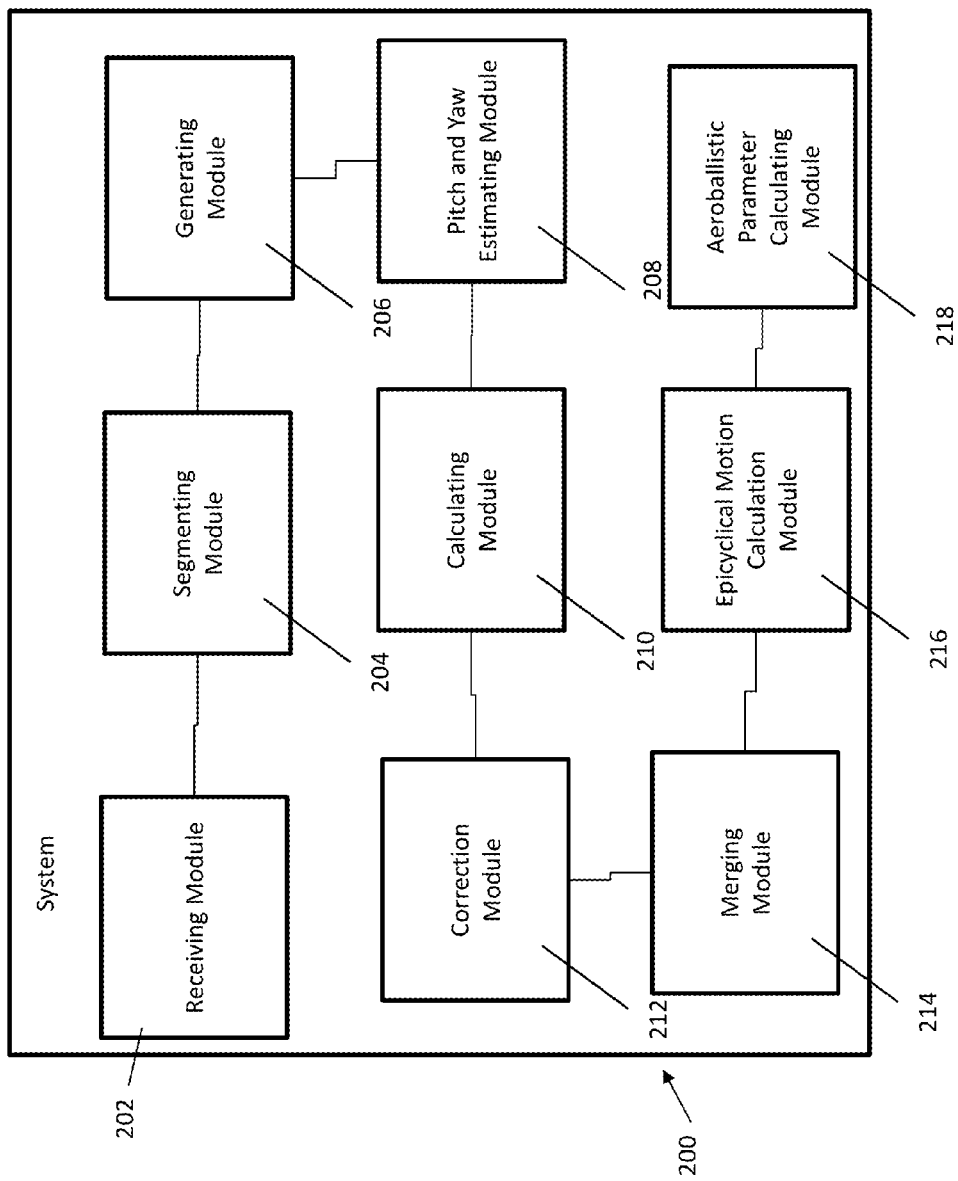
FIG. 2 illustrates a system for analyzing a cannon-launched artillery video of a projectile launched from a gun in accordance with one embodiment of the present disclosure.

With reference to FIG. 2, shown is a block diagram of a system 200 for implementing the method 100 for analyzing a cannon-launched artillery video of a projectile launched from a gun according to an exemplary embodiment of this disclosure.

The system 200 comprises a processor in communication with a memory where the memory stores instructions for performing the steps of: (i) receiving a first projectile launch video recording of a projectile launched from a gun generated by a first video camera system, the first projectile launch video having a plurality of first image frames, at least a portion of the plurality of first image frames containing an expected projectile shape; (ii) receiving a second projectile launch video recording of the projectile launched from the gun generated by a second video camera system, the second video camera system being positioned at a different location from the first video camera system, the second projectile launch video having a plurality of second image frames, at least a portion of the plurality of second image frames containing an expected projectile shape; (iii) generating a first pitch history by segmenting a projectile shape in each of the first image frames of the plurality of first image frames; (iii) generating a second pitch history by segmenting a projectile shape in each of the second image frames of the plurality of second image frames; (iv) generating a first corrected pitch history by receiving first mirror rotation data corresponding with the first projectile launch video, and recording and correcting the first pitch history for skew angle and camera misalignment; (v) generating a second corrected pitch history by receiving second mirror rotation data corresponding with the second projectile launch video, and recording and correcting the second pitch history for skew angle and camera misalignment; (vi) receiving geodetic information associated with the location geometry of the first video camera system, the second video camera system, and the gun; and (vii) estimating the pitch and the yaw of the projectile based on the first corrected pitch history, the second corrected pitch history, and the geodetic information.

The system 200 includes a receiving module 202, a segmenting module 204, a generating module 206, a pitch and yaw estimating module 208, a velocity calculating module 210, a correction module 212, a merging module 214, an epicyclical motion calculating module 216, and an aeroballistic parameter calculating module 218. Each of these components 202-218 are described in more detail below.

The receiving module 202 is configured to receive a video of a launch of a projectile (e.g., from one or more camera/tracking systems) in which the projectile has at least one marking disposed thereon. During recording of a projectile launch, a recorded launch video and a mirror rotation data can be generated (e.g., in a digital format). In one example, the system 200 includes a single receiving module 202 for receiving both the first and second projectile launch videos. In another example, the system 200 can include first and second receiving modules (not shown) for receiving the corresponding first and second projectile launch videos.

The segmenting module 204 is configured to receive the first and second launch videos from the receiving module 202, and segment a projectile shape in each of the first image frames and the second image frames. From the segmented first and second image frames, a corresponding first and second pitch history is generated. In one example, the system 200 includes a single segmenting module 204 for segmenting both the first and second projectile launch videos. In another example, the system 200 can include first and second segmenting modules (not shown) for segmenting the corresponding first and second projectile launch videos. The segmentation process of the first and second image frames is described in more detail below. It will be appreciated that the projectile segmentation process extracts information from each launch video such as the projectile location and orientation in each image frame, is extracted. For example, the first and second launch videos can be subject to the same segmentation process. During the segmentation process, an Active Shape Model (ASM) data is used in determining the projectile shape, as described in more detail below.

The generating module 206 is configured to generate first and second corrected pitch histories. To do so, the generating module 206 is configured to receive first minor rotation data corresponding with the first projectile launch video and second mirror rotation data corresponding with the second projectile launch video. The generating module 206 then records the first and second mirror rotation data, and corrects of a skew angle and a camera misalignment for the first and/or the second mirror rotation data. From these corrections, the corresponding first and second corrected pitch histories are generated. In one example, a translation movement of the projectile in the first and/or second projectile launch video can be corrected. In another example, the observed pitching angle relative to the horizontal axis of the frame ($\Phi_{obs}$) in the first and/or second projectile launch video can be corrected. In a further example, a pitch measurement for skew angle and camera misalignment in the first and/or projectile launch video can be corrected. In one example, the system 200 includes a single generating module 206 for generating both the first and second corrected pitch histories. In another example, the system 200 can include first and second generating modules (not shown) for generating the corresponding first and second corrected pitch histories. The generation process of the first and second corrected pitch histories is described in more detail below.

The receiving module 202 is configured to also receive geodetic information associated with the location geometry of at least one of a first video camera system (not shown), a second video camera system (not shown), and a gun (not shown).

The receiving module 202 is then configured to transfer the first corrected pitch history, the second corrected pitch history, and the geodetic information to the pitch and yaw estimating module 208. These pitch and yaw estimating module 208 then estimates the pitch and yaw measurements of the projectile based on the first corrected pitch history, the second corrected pitch history, and the geodetic information.

The velocity calculating module 210 is configured to from an orthogonal point and camera sweep plane of the first and second projectile launch videos. An example of the process of the velocity calculating module 210 is described in more detail below.

The correction module 212 is configured to correct the pitch and yaw measurements calculated by the pitch and yaw calculating module 208 with the velocity vector calculated by the velocity calculating module 210. An example of the process of the correction module 212 is described in more detail below.

The merging module 214 is configured to merge the corrected pitch and yaw measurements from the first and second pitch histories and position estimates of the first and second camera systems. An example of the process of the merging module 214 is described in more detail below.

The epicyclical motion calculating module 216 is configured to determine an epicyclical motion of the projectile from the merged pitch and yaw measurements. An example of the process of the epicyclical motion calculating module 216 is described in more detail below.

The aeroballistic parameter calculating module 218 is configured to determine an aeroballistic parameter from the epicyclical motion of the projectile calculated from the epicyclical motion calculating module 216. An example of the process of the aeroballistic parameter calculating module 218 is described in more detail below.

Figure 3A:
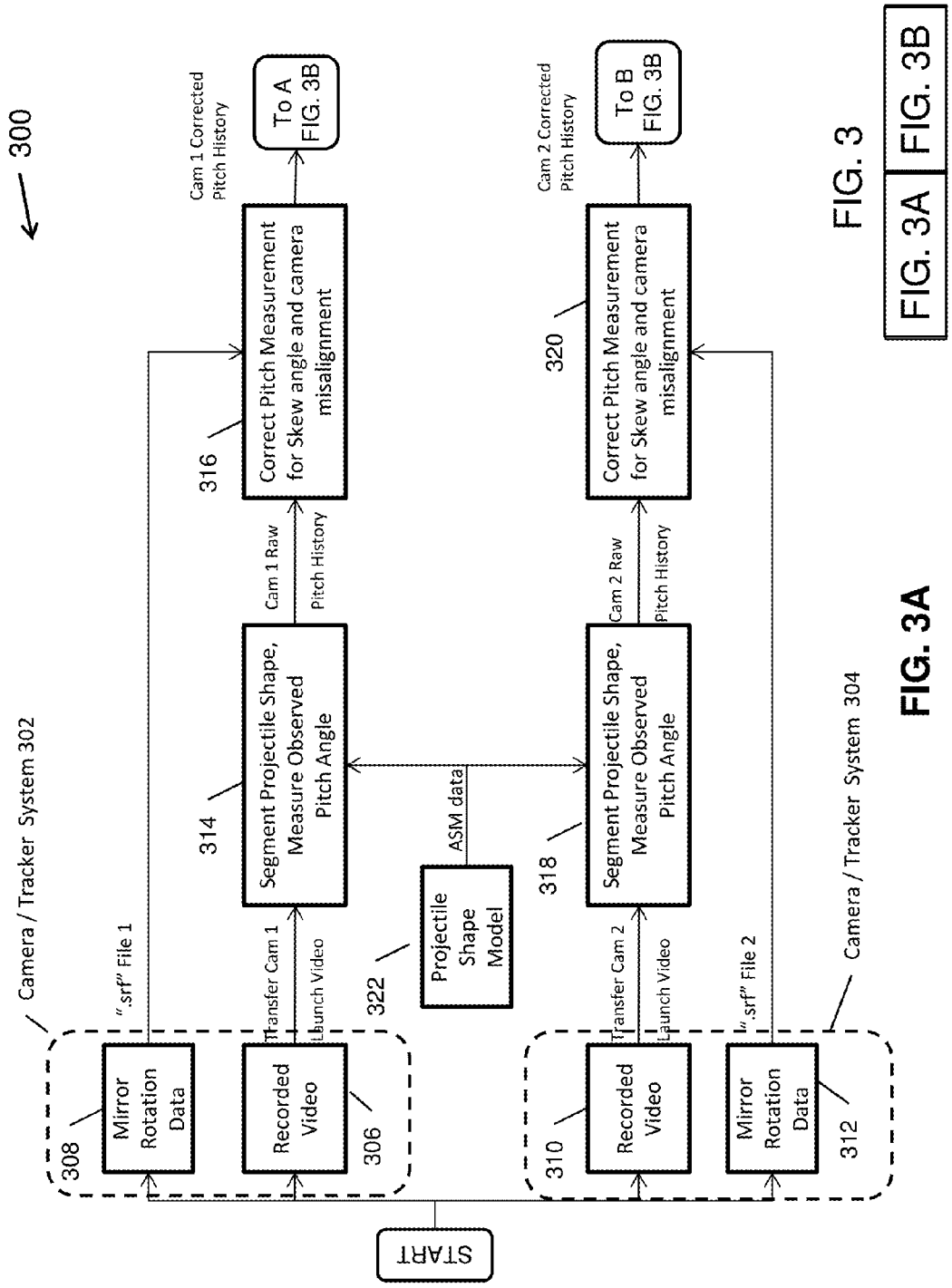
FIG. 3A and FIG. 3B, illustrates a process flow diagram of a method for computer vision analysis of cannon-launched artillery video in accordance with one embodiment of the present disclosure.
Figure 3B:
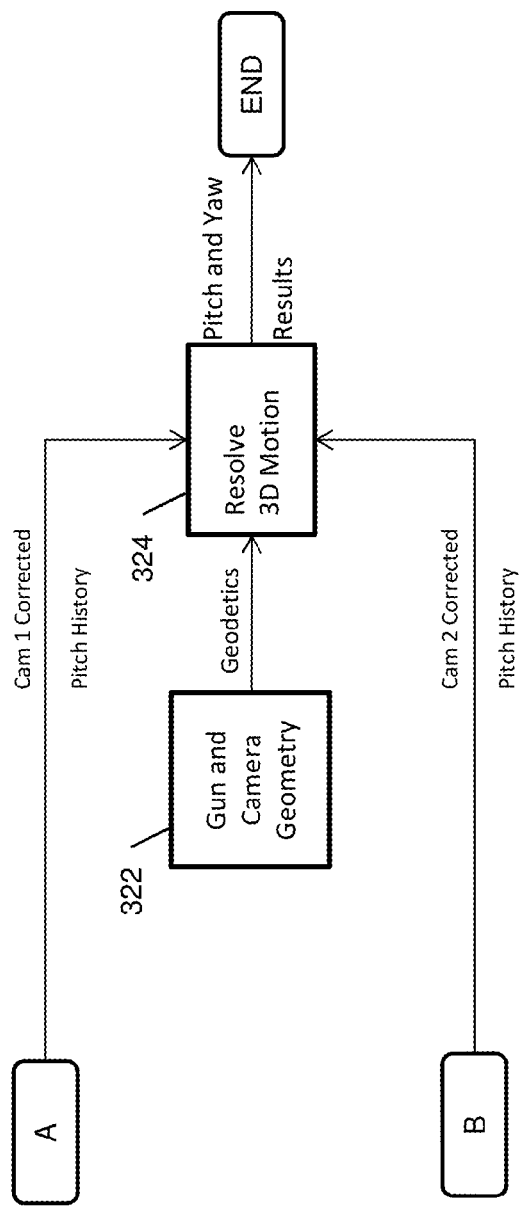

FIGS. 3A and 3B show the camera/tracker systems and methods thereof of the present disclosure. Referring now FIG. 3A, in one embodiment, a launch video of a projectile is received from each of a first and a second camera/tracker system 302 and 304. During recording of a projectile launch, the first camera/tracker system 302 generates a recorded launch video 306 and mirror rotation data 308. At the same time, the second camera/tracker system 304 generates a recorded launch video 310 and minor rotation data 312. In one embodiment, the recorded launch videos 306, 310 and the corresponding mirror rotation data 308, 312 are received in a digital format.

In one embodiment, the recorded launch video 306 is input to a first projectile segmentation process 314 and the recorded launch video 310 is input to a second projectile segmentation process 318. Information from each of first and second launch videos 306, 310, such as the projectile location and orientation in each image frame, is extracted utilizing a segmentation process. In one embodiment, the first and second projectile segmentation processes 314 and 318 utilize the same segmentation process. During the first and second segmentation processes 314 and 318, Active Shape Model (ASM) data 322 is used in determining the projectile shape, as described in more detail below.

The extracted information from each launch video and minor rotation data from each camera system are input to sequential post processing operations of the translational movement, analysis and correction of the observed pitching angle relative to the horizontal axis of the frame ($\Phi_{obs}$), and quantification of the corrected epicyclic motion. For example, information extracted from the first launch video 306 in the first segmentation operation 314 and the corresponding first mirror rotation data 208 are input to a first post-processing operation 316 to correct pitch measurement for skew angle and camera misalignment. Similarly, information extracted from the second launch video 310 in the second segmentation operation 318 and the corresponding second mirror rotation data 312 is input to a second post-processing operation 320 to correct pitch measurement for skew angle and camera misalignment. Referring to partial view FIG. 3B, the outputs from the first and second post-processing operations 318 and 320 are input to a resolution operation 324 together with gun and camera geometry information 322, to resolve the three-dimensional (3D) motion of the projectile with resultant outputs of the projectile motion, i.e., pitch and yaw results.

Figure 4A:
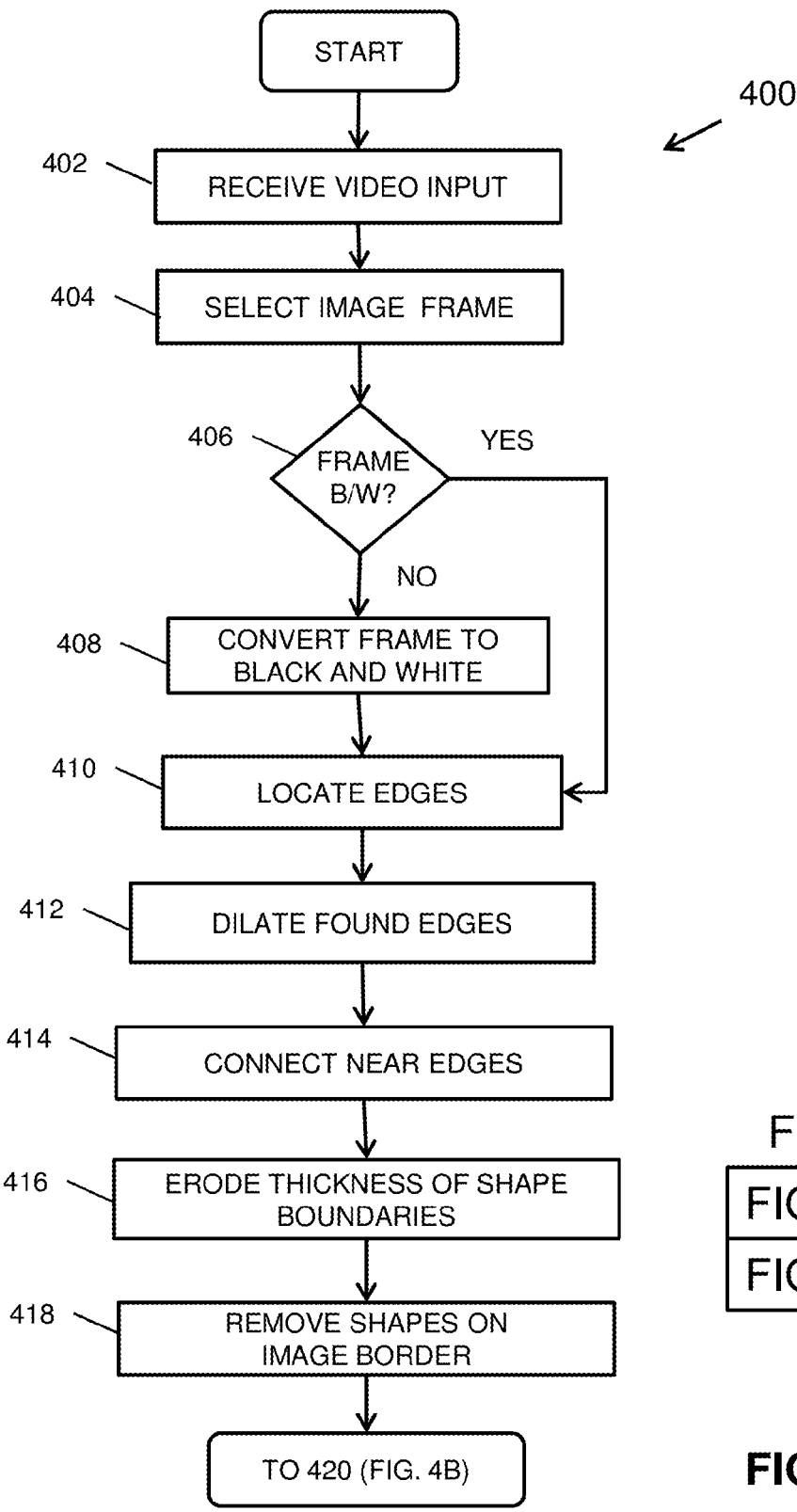
FIG. 4A and FIG. 4B, illustrates a process flow diagram of a method for segmenting a projectile shape in a video frame in an operation of the method of FIG. 1 and in accordance with one embodiment of the present disclosure.
Figure 4B:
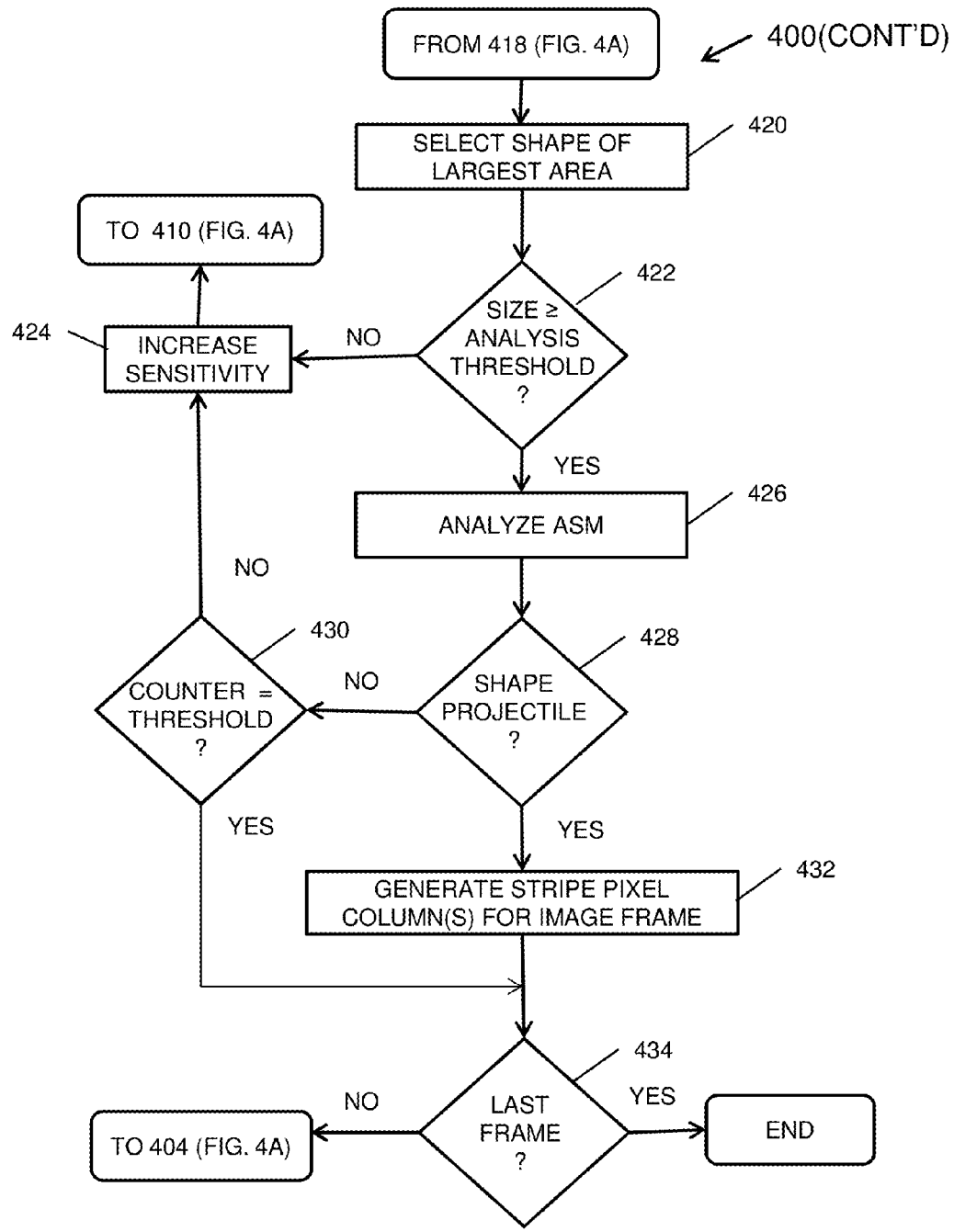

FIGS. 4A and 4B illustrate a process flow diagram 400 of 106 and 108 (FIG. 1) for segmenting a projectile shape in a video frame in accordance with one embodiment of the present disclosure. In one embodiment, 106 and 108 is used for segmenting a projectile shape, if any, in each video frame of a received launch video in the method 100 (FIG. 1). 106/108 (FIGS. 4A and 4B) includes: receiving the first and second projectile launch videos 402; selecting an image frame from each video 404; determining whether the selected image frame is a black and white image 406; converting the selected image to a black and white image when the selected image frame is not a black and white image 408; locating a plurality of edges from the image frame 410; dilating the plurality of edges 412; connecting at least two of the plurality of the edges adjacent each other to define at least one shape 414; eroding a thickness of a boundary of the at least one shape 416; removing the at least one shape from a border of the image, the border being defined by the plurality of edges 418; selecting a shape from the at least one shape having a largest area of the at least one shape 420; determining when a size of the shape with the largest area is greater than or equal to a predefined sensitivity threshold 422; repeating or reprocessing 402-422 when the size of the shape with the largest area is less than the predefined sensitivity threshold while increasing the sensitivity of the video until the size of the shape with the largest area is less than the predefined sensitivity threshold is greater than or equal to the predefined sensitivity threshold 424; analyzing an active shape model of the shape with the largest area when the size of the shape with the largest area is greater than or equal to the predefined sensitivity threshold 426; determine when the shape with the largest area is the projectile from the video 428; determine the number of iterations of 402-422 have occurred when the shape with the largest area is determined not to be the projectile and increasing the sensitivity of the video when the number of iterations of 402-422 is less than a predefined iteration threshold and ceasing segmenting the plurality of shapes of the projectile from the video when the number of iterations of 402-422 is equal to the predefined iteration threshold 430; generating a stripe pixel column for the image frame when the shape with the largest area is determined to be the projectile in the video 432; determine when the image frame is the last image frame in the video and repeating 402-422 when the image frame is not the last image frame in the video and extracting at least one column of pixels of the at least one marking from the shapes from the image frame 434.

At 402, the first and second launch videos are received. For example, the first and second launch videos are received by the receiving module 202 (FIG. 2) and transferred to the segmenting module 204.

Figure 5:
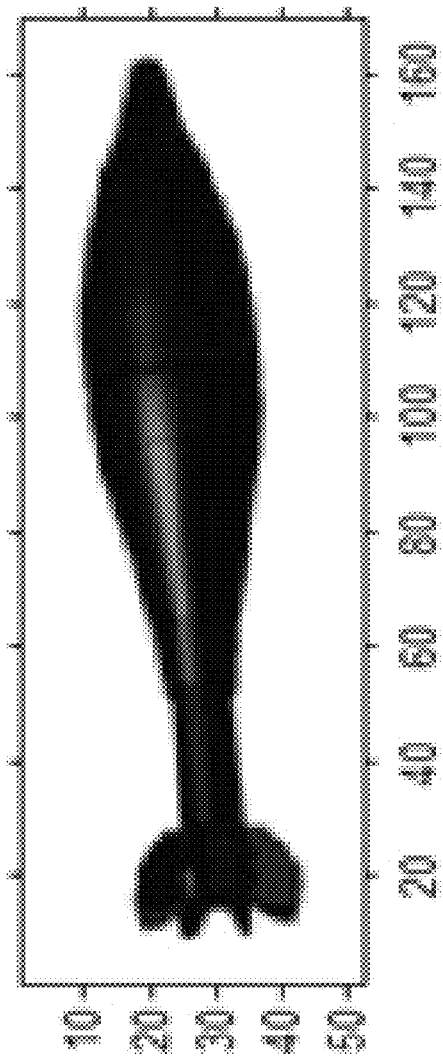
FIG. 5 illustrates an original image of a projectile in an image frame of a launch video.

At 404 (FIGS. 4A and 4B), an image frame is selected from the launch video. For example, the launch video includes sequential video frames taken of a projectile launch. An image frame (e.g., an initial or first image frame) is selected for segmentation. Each video frame can include information, such as time, frame number, and the video frame rate. In one embodiment, optical character recognition is used to read selected information such as the time, frame number, and the video frame rate on each video frame. As described above, the projectile can have one more markings disposed thereon. As shown in FIG. 5, the markings can be one or more stripes that is painted on a portion (e.g., a nose) of the projectile. The stripe can extend from the nose towards a center of the projectile, or alternatively to a tail of the projectile. The image frames of the launch video also includes information (e.g., location and orientation) of the at least one stripe of the projectile.

At 406 (FIGS. 4A and 4B), a determination is made whether or not the selected image frame is a black and white image. For example, the projectile may appear in the image as a first color (e.g., white) and the stripe may appear in the image as a different second color (e.g., black). If the image were in color (e.g., with more than two colors), it can be difficult to distinguish between the stripe and the projectile and, thus, it is more difficult to determine the spin rate of the projectile.

At 408, the selected image is converted to a black or white image if the image is determined to be not black and white (e.g., the image is determined to be a color image). The selected frame is then converted to a black and white video frame, e.g., converted from color to grayscale using conventional techniques.

In 410-418, smoothing operations are applied to the selected image frame to suppress noise in the video frame image. Edge detection techniques with variable sensitivity are combined with morphological operations to identify candidate projectile shapes in the image. Candidate shapes in contact with the image border are removed. This process is illustrated in FIGS. 5-10.

Figure 6:
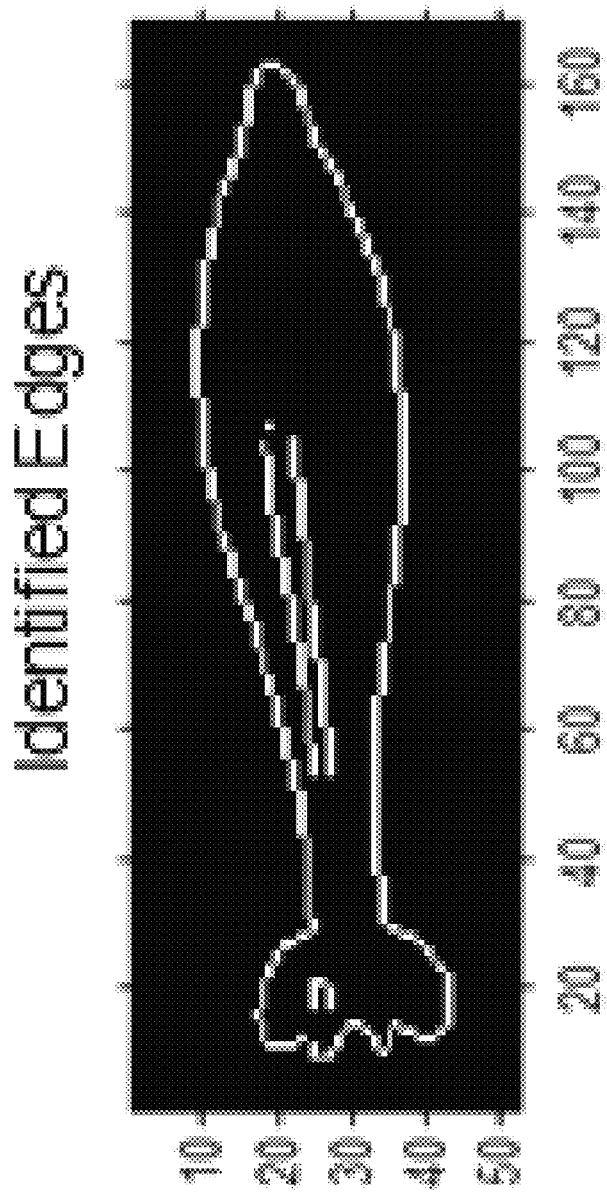
FIG. 6 illustrates an initial binary image with found edges generated from the image of FIG. 5 in accordance with one embodiment of the present disclosure.

At 410, a plurality of edges of the selected image is located. For example, FIG. 5 shows an original image of a projectile in an image frame (i.e., the selected frame) of the launch video. One or more edges of the shape of the projectile are located or found in the image frame. The edges can be located using any suitable technique or algorithm (e.g., Canny technique, Sobel Filter Method, and the like). FIG. 6 illustrates an initial binary image with found edges generated from the image of FIG. 5.

Figure 7:
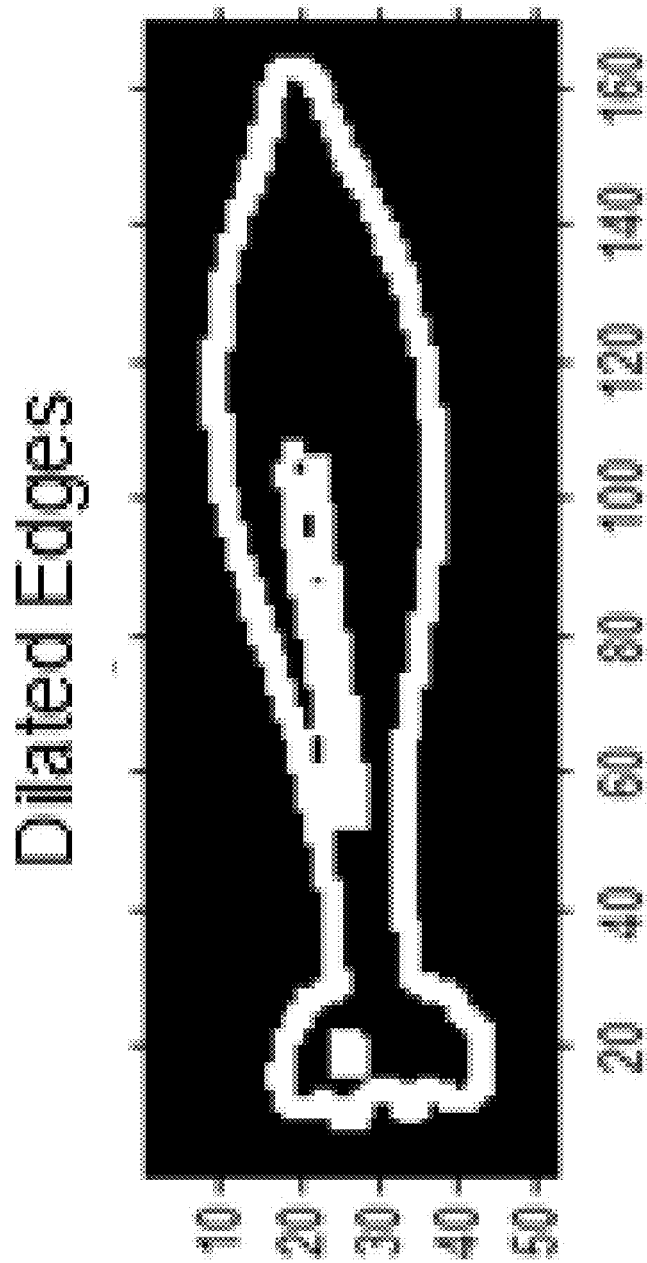
FIG. 7 illustrates a binary image after dilation of found edges in the binary image of FIG. 6 in accordance with one embodiment of the present disclosure.

At 412, the located edges are dilated. The located edges are dilated so they are more easily viewable. The edges can be dilated using any suitable technique. FIG. 7 shows a binary image after dilation of the located edges in the binary image of FIG. 6.

Figure 8:
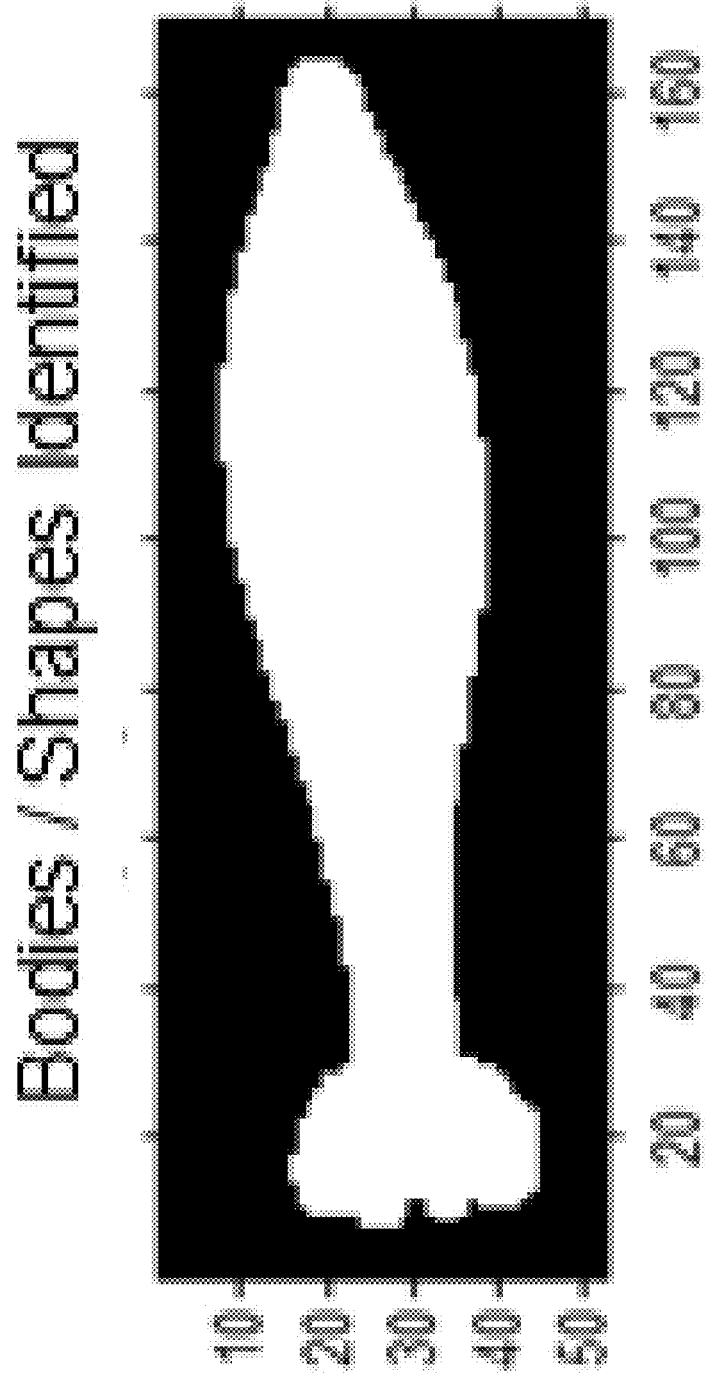
FIG. 8 illustrates a binary image after filling of holes in the binary image of FIG. 7 in accordance with one embodiment of the present disclosure.

At 414, at least two of the plurality of the edges adjacent each other are connected together to define at least one shape. For example, adjacent edges of the dilated edges are connected to form shape boundaries. The adjacent edges can be connected together using any suitable technique. FIG. 8 shows a binary image after filling of holes in the binary image of FIG. 7.

Figure 9:
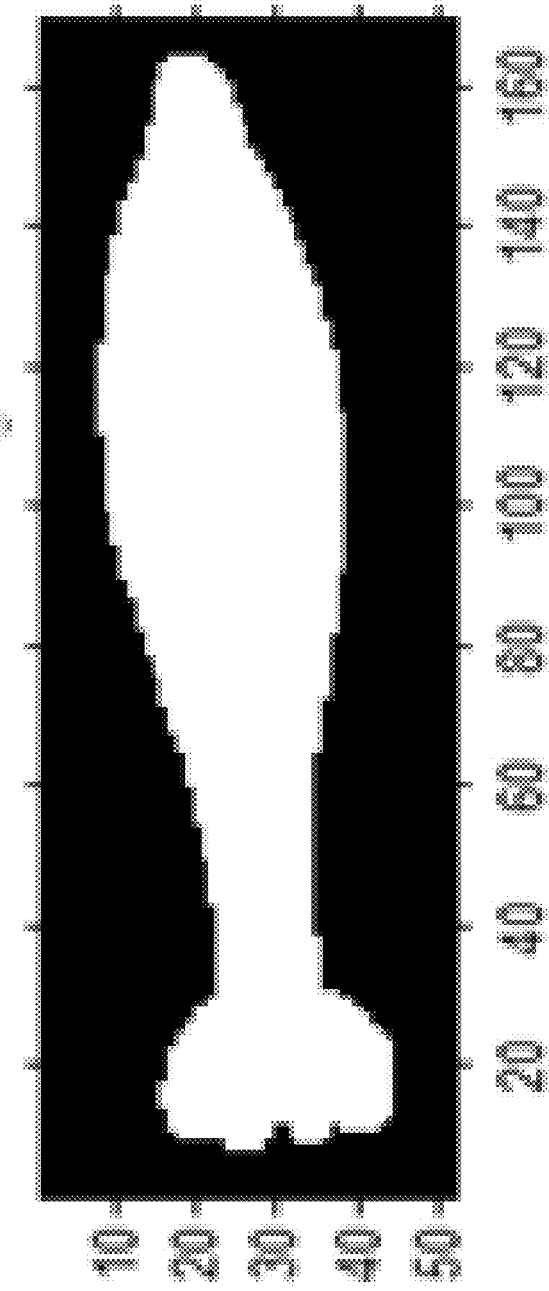
FIG. 9 illustrates a binary image after clearing the border of the binary image of FIG. 8 in accordance with one embodiment of the present disclosure.

At 416, a thickness of a boundary of the at least one shape is eroded. The boundaries are eroded so the image is more clear (i.e., the projectile is more visible). The boundaries can be eroded using any suitable technique. FIG. 9 shows a binary image after clearing the border of the binary image of FIG. 8.

Figure 10:
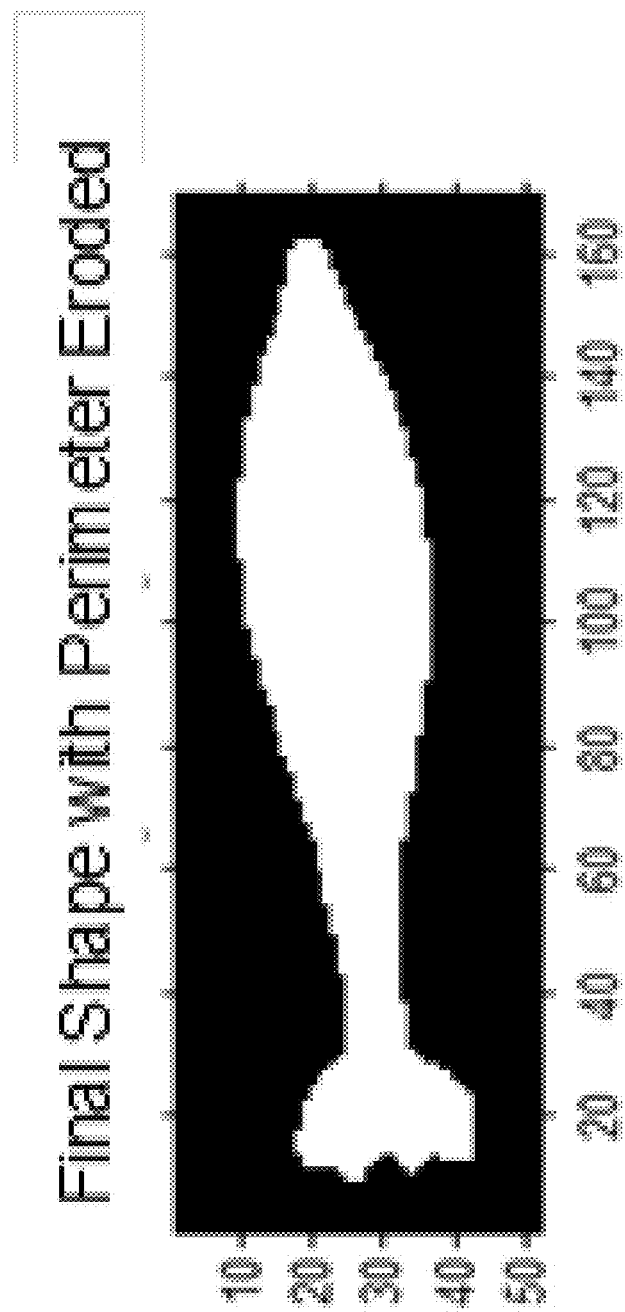
FIG. 10 illustrates a resultant segmented binary image in accordance with one embodiment of the present disclosure.

At 418, the at least one shape is removed from a border of the image in which the border is defined by the plurality of edges. The shape is removed so that the image (i.e., the projectile) is more visible. The shape can be removed using any suitable technique. FIG. 10 shows a resultant segmented binary image in which the shape of FIG. 9 is removed.

At 420, a shape from the at least one shape having a largest area of the at least one shape is selected. For example, the projectile in the image frame has the shape with the largest area in the image frame. As a result, one or more shapes that are located on the image border (i.e., the border of the projectile) are removed. By doing so, shapes on the outside of the border of the projectile in the image frame (e.g., telephone poles, mountains, trees, cacti, and the like) are not considered when looking for the largest shape (i.e., the projectile).

At 422, a determination is made as to when a size of the shape with the largest area is greater than or equal to a predefined sensitivity threshold. Stated another way, the size of the projectile in the image frame is compared to the predefined sensitivity threshold to determine if the image of the projectile is actually the projectile in the launch video. If the size of the shape with the largest area (i.e., the projectile) is greater than or equal to the predefined threshold, then the shape with the largest area is determined to actually be the projectile. If the size of the shape with the largest area is less than the predefined sensitivity, then the shape with the largest area is not the projectile. This determination can be made using any suitable techniques.

At 424, a determination that 402-422 should be repeated when the size of the shape with the largest area is less than the predefined sensitivity threshold. For example, the sensitivity threshold of the video is increased, so that shapes with larger areas can be identified (i.e., using 402-424). For example, in one embodiment, the predefined sensitivity threshold can be an area of approximately 1,000 pixels. 402-422 is repeated until the sensitivity of the video is at a level such that an image thought to be the projectile is obtained (i.e., by having more than 1,000 pixels). Alternatively, when the size of the shape is greater than or equal to the analysis threshold, the shape is determined large enough for further processing and analysis of the video continues.

At 426, an active shape model of the shape with the largest area is analyzed when the size of the shape with the largest area is greater than or equal to the predefined sensitivity threshold. For example, when the largest candidate shape has an area greater than 1,000 pixels, (i.e., the predefined sensitivity threshold), the shape is compared to an Active Shape Model (ASM). An ASM is a numerical model used to represent natural shape variability of a training set of similar objects. When the candidate shape is within a threshold distance from the ASM, the pixel locations of that shape are classified as belonging to the projectile. In one example, the shape is analyzed for a corresponding ASM by fitting. In one embodiment, the segmented shape is fitted to the ASM using the measurement of a pitch angle $\Phi_{obs}$. In one embodiment the nose region of the projectile is defined as the five percent of pixels that are farthest from the central moment of the entire projectile shape. Then, $\Phi_{obs}$ is calculated from the angle between the central moment of the nose region and the central moment of the projectile using Equation 1:

$$\Phi_{obs} = \tan^{-1}\left(\frac{\text{Nose}_{moment,y} - \text{Center}_{moment,y}}{\text{Nose}_{moment,x} - \text{Center}_{moment,x}}\right). \quad \text{Equation 1}$$

This results in a robust measurement of $\Phi_{obs}$ which is dependent upon the average of hundreds of pixels as opposed to the precision of just a single pixel as used in other conventional methods such as manual scoring.

At 428, a determination is made as to whether the shape with the largest area is the projectile from the video. For example, a determination is made whether the shape is a projectile, (i.e., whether the shape is correctly fitted to the ASM). The variation is compared between the segmented shape and the projectile. If the variation is below a threshold (e.g., an area of 3 pixels), then the shape in the image is confirmed as the projectile from the launch video.

At 430, a determination is made as to the number of iterations of 402-422 have occurred when the shape with the largest area is determined not to be the projectile. In some embodiments, when the shape in the image frame did not fit the ASM model, a determination is made as to how many times the image frame has been reprocessed (i.e., by 402-422) and is compared to a predefined iteration threshold. For example, the predefined iteration threshold can be set at 10 iterations. If the image frame has been reprocessed less than the predefined iteration threshold (i.e., the image frame has been reprocessed less than 10 times), the analysis continues to 424, where the sensitivity is increased. If, however, the image frame is equal to the predefined iteration threshold (i.e., the image frame has been reprocessed 10 times) the analysis ceases and a determination is made that the image frame does not include the projectile.

At 432, a stripe pixel column for the image frame is generated when the shape with the largest area is determined to be the projectile in the video. For example, when the shape in the image frame is correctly fit to the ASM model (i.e., at 428), a sequential stripe pixel history of the image frame is generated. This sequential stripe pixel history is used in 110/112 (FIG. 1).

At 434, a determination is made as to whether the image frame is the last image frame in the video. For example, if the image frame is not the last frame in the image, 402-432 is repeated until all the image frames of the launch video have been analyzed. If the image frame is the last image frame in the video, the method 106/108 ceases and continues to 110/112.

Figure 11:
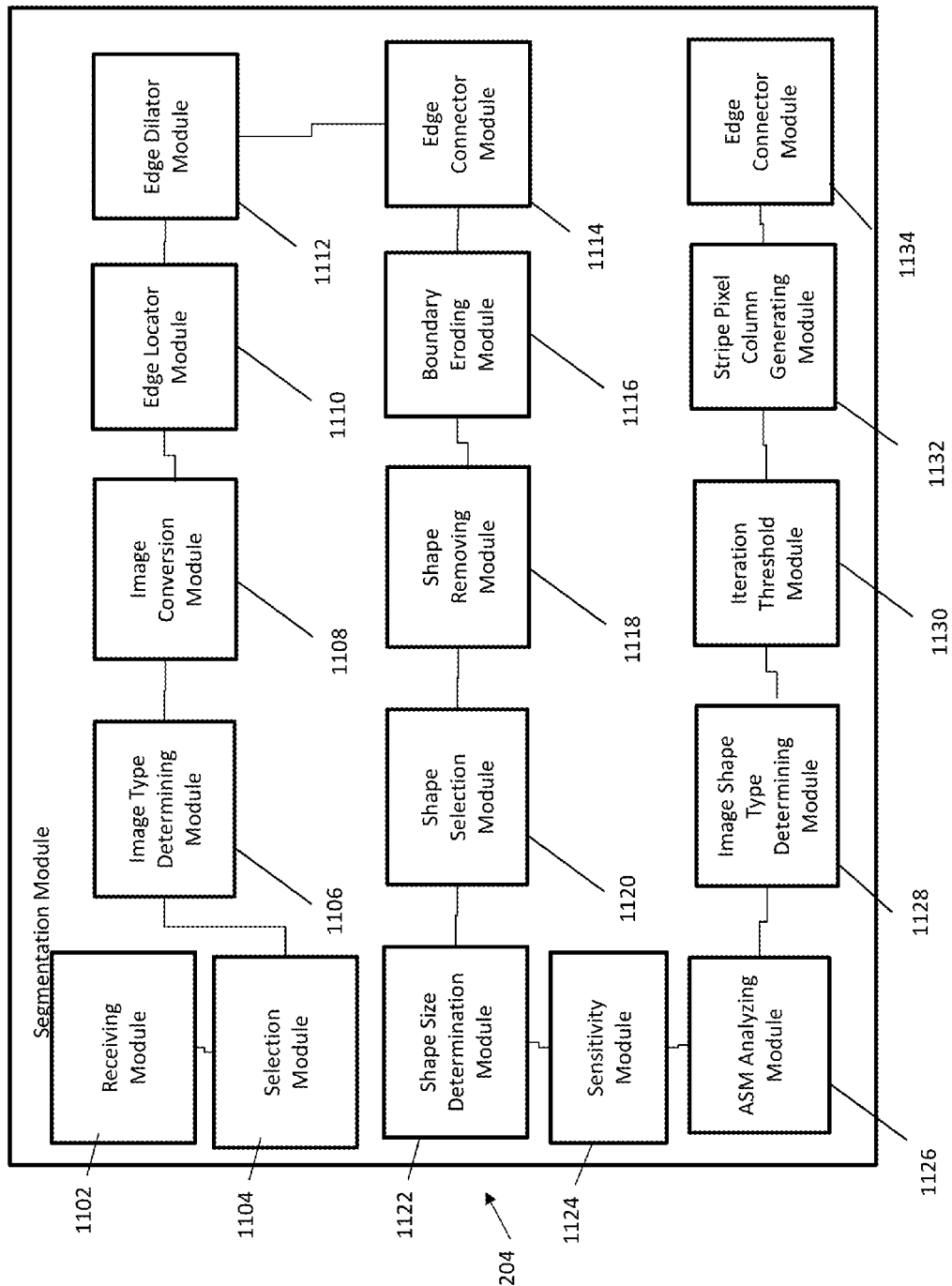
FIG. 11 illustrates a system for segmenting a projectile shape in a video frame in an operation of the system of FIG. 4A and FIG. 4B and in accordance with one embodiment of the present disclosure.

With reference to FIG. 11, shown is a block diagram of the segmenting module 204 to implement the method 106/108 for segmenting a plurality of shapes of a projectile from the first and second launch videos according to an exemplary embodiment of this disclosure.

As shown in FIG. 11, the segmenting module 204 includes a receiving module 1102; a selection module 1104; an image type determining module 1106; an image conversion module 1108; an edge locator module 1110; an edge dilator module 1112; an edge connector module 1114; a boundary eroding module 1116; a shape removing module 1118; a shape selection module 1120; a shape size determination module 1122; a sensitivity module 1124; an ASM analyzing module 1126; an image shape type determining module 1128; an iteration threshold module 1130; a stripe pixel column generating module 1132; and a last frame determination module 1134. Each of these components 1102-1134 are described in more detail below.

The receiving module 1102 is configured to receive first and second launch videos. For example, the receiving module 1102 of the segmenting module 204 is configured to receive the first and second launch videos from the receiving module 202 (FIG. 2).

The selection module 1104 is configured to select an image frame from the first and/or the second launch video. For example, the launch video includes sequential video frames taken of a projectile launch. An image frame (e.g., an initial or first image frame) is selected for segmentation. Each video frame can include information, such as time, frame number, and the video frame rate.

The image type determining module 1106 is configured to determine whether or not the selected image frame is a black and white image. For example, the projectile may appear in the image as a first color (e.g., white) and the stripe may appear in the image as a different second color (e.g., black). If the image were in color (e.g., with more than two colors), it can be difficult to distinguish between the stripe and the projectile and, thus, it is more difficult to determine the spin rate of the projectile.

The image conversion module 1108 is configured to convert the selected image to a black or white image if the image is determined to be not black and white (e.g., the image is determined to be a color image). The selected frame is then converted to a black and white video frame, e.g., converted from color to grayscale using conventional techniques.

The edge locator module 1110 is configured to locate a plurality of edges of the selected image is located. For example, one or more edges of the shape of the projectile are located or found in the image frame. The edge locator module 1108 can be configured with any suitable edge location technique or algorithm (e.g., Canny technique, Sobel Filter Method, and the like).

The edge dilator module 1112 is configured to dilate the located edges. The located edges are dilated so they are more easily viewable.

The edge connector module 1114 is configured connected together at least two of the plurality of the edges adjacent each other to define at least one shape. For example, adjacent edges of the dilated edges are connected to form shape boundaries.

The boundary eroding module 1116 is configured to erode a thickness of a boundary of the at least one shape is eroded. The boundaries are eroded so the image is more clear (i.e., the projectile is more visible).

The shape removing module 1118 is configured to remove the at least one shape from a border of the image in which the border is defined by the plurality of edges. The shape is removed so that the image (i.e., the projectile) is more visible.

The shape selection module 1120 is configured to select a shape from the at least one shape having a largest area of the at least one shape. For example, the projectile in the image frame has the shape with the largest area in the image frame. As a result, one or more shapes that are located on the image border (i.e., the border of the projectile) are removed. By doing so, shapes on the outside of the border of the projectile in the image frame (e.g., telephone poles, mountains, trees, cacti, and the like) are not considered when looking for the largest shape (i.e., the projectile).

The shape size determination module 1122 is configured to determine when a size of the shape with the largest area is greater than or equal to a predefined sensitivity threshold. Stated another way, the size of the projectile in the image frame is compared to the predefined sensitivity threshold to determine if the image of the projectile is actually the projectile in the launch video. If the size of the shape with the largest area (i.e., the projectile) is greater than or equal to the predefined threshold, then the shape with the largest area is determined to actually be the projectile. If the size of the shape with the largest area is less than the predefined sensitivity, then the shape with the largest area is not the projectile.

The sensitivity module 1124 is configured to determine whether the image should be reprocessed (e.g., with modules 1102-1122) when the size of the shape with the largest area is less than the predefined sensitivity threshold. For example, the sensitivity threshold of the video is increased, so that shapes with larger areas can be identified. For example, in one embodiment, the predefined threshold can be an area of approximately 3,000 pixels. The processes of modules 1102-1122 are repeated until the sensitivity of the video is at a level such that an image thought to be the projectile is obtained (i.e., by having more than 3,000 pixels). Alternatively, when the size of the shape is greater than or equal to the analysis threshold, the shape is determined large enough for further processing and analysis of the video continues.

The ASM analyzing module 1126 is configured to analyze an active shape model of the shape with the largest area when the size of the shape with the largest area is greater than or equal to the predefined sensitivity threshold. For example, when the largest candidate shape has an area greater than 3,000 pixels, (i.e., the predefined sensitivity threshold), the shape is compared to an Active Shape Model (ASM). An ASM is a numerical model used to represent natural shape variability of a training set of similar objects. For artillery projectiles, the training set consists of images of projectiles having the same number and position of stripes. When the candidate shape is within a threshold distance from the ASM, the pixel locations of that shape are classified as belonging to the projectile. In one example, the shape is analyzed for a corresponding ASM by fitting. In one embodiment, the segmented shape is fitted to the ASM using the measurement of $\Phi_{obs}$ (Equation 1). In one embodiment the nose region of the projectile is defined as the five percent of pixels that are farthest from the central moment of the entire projectile shape.

The image shape type determining module 1128 is configured to determine whether the shape with the largest area is the projectile from the video. For example, a determination is made whether the shape is a projectile, (i.e., whether the shape is correctly fitted to the ASM). The variation is compared between the segmented shape and the projectile. If the variation is below a threshold (e.g., an area of 3 pixels), then the shape in the image is confirmed as the projectile from the launch video.

The iteration threshold module 1130 is configured to determine the number of reprocessing operations have occurred when the shape with the largest area is determined not to be the projectile. In some embodiments, when the shape in the image frame did not fit the ASM model, a determination is made as to how many times the image frame has been reprocessed and is compared to a predefined iteration threshold. For example, the predefined iteration threshold can be set at 10. If the image frame has been reprocessed less than the predefined iteration threshold (i.e., the image frame has been reprocessed less than 10 times), the sensitivity module 1124 increases the sensitivity of the video. If, however, the image frame is equal to the predefined iteration threshold (i.e., the image frame has been reprocessed 10 times) the analysis ceases and a determination is made that the image frame does not include the projectile.

The stripe pixel column generating module 1132 is configured to generate a stripe pixel column for the image frame when the shape with the largest area is determined to be the projectile in the video. For example, when the shape in the image frame is correctly fit to the ASM model (i.e., by the ASM analyzing module 1126), a sequential stripe pixel history of the image frame is generated. This sequential stripe pixel history is used by the generating module 206 (FIG. 2).

The last frame determination module 1134 is configured to determine whether the image frame is the last image frame in the video. For example, if the image frame is not the last frame in the image, the processes of the modules 1102-1132 is repeated until all the image frames of the launch video have been analyzed. If the image frame is the last image frame in the video, the generating module 1006 receives the stripe pixel history from the segmentation module 204.

EXAMPLES

Figure 12:
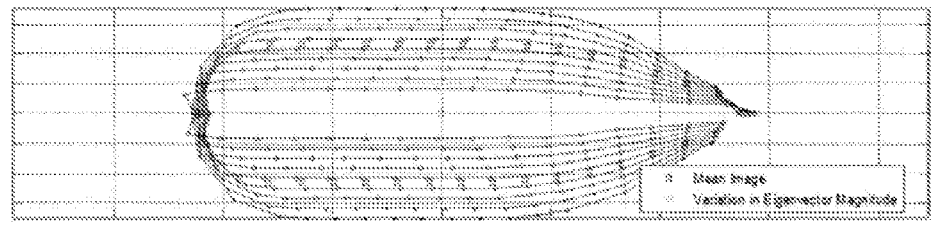
FIG. 12 illustrates a projectile active shape model.
Figure 13:
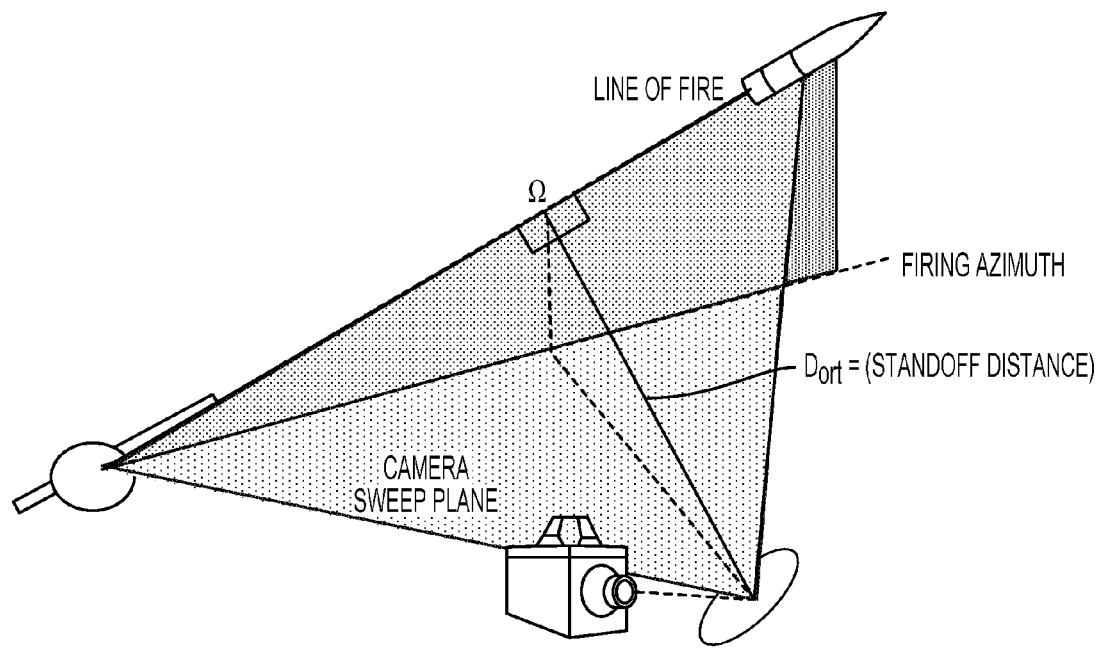
FIG. 13 illustrates a sweep plane profile.

In one embodiment, the camera/tracker systems 302, 304 (FIGS. 3A and 3B) include camera/tracker software that determines various information associated with the system. An a-priori estimate for the projectile muzzle velocity is used as an input by the camera/tracker software to determine a predicted sweep path for the mirror. The simplicity of the geometry in FIGS. 12 and 13 allows all calculations to be conducted using a coordinate frame centered at the orthogonal point (Ω) and in the camera sweep plane. For each shot, the camera/tracker system software generates a scan output file that contains the time-history of the minor rotation recorded during the tracking operation. This data is utilized for the velocity and pitching motion analysis of segmenting operations 106, 108, 314, 318.

Example 1: Velocity Vector Calculation 118

The following details are described with reference to the method of operation 118 (FIG. 1). In operation 118, in one embodiment, initially a velocity analysis is performed. A critical value extracted from the scan output file is the standoff distance ($D_{ort}$) which represents the distance of the camera to the LOF in the sweep plane. When the projectile has reached the orthogonal point (Ω), it is exactly $D_{ort}$ meters from the camera. The number of pixels between the nose and the base of the projectile when it reaches this point ($N_{proj}$) can be used to determine an estimate of the number of radians per image pixel (K) for the entire launch video using Equation 2:

$$K = 2N_{proj}^{-1} \tan^{-1}(0.5 L D_{ort}^{-1})$$  Equation 2, where L is the actual projectile length. The number of radians per pixel is required for correcting the position and velocity estimates.

The corrected angular position of the projectile is calculated using Equations 3 and 4:

$$\Psi_x = \Psi_{centerpixel,x} + \Psi_{correction,x}, \Psi_{correction,x} = K(\text{Center-}moment,x - 0.5 N_{cols})$$  Equation 3, and $$\Psi_y = K(\text{Center}_{moment,y} - 0.5 N_{rows})$$  Equation 4, where the rotation of the center pixel ($\Psi_{centerpixel,x}$) is taken from the scan output file, and $N_{cols}$ and $N_{rows}$ refer to the image resolution (usually 1024×512).

Using these corrections for the projectile viewing skew angle history, the velocities in the horizontal (X) and vertical (Y) directions are determined from:

$$V_x = D_{ort} \frac{\Delta(\sec^2(\Psi_x))}{\Delta t}, V_y = D_{ort} \frac{\Delta(\sec^2(\Psi_y))}{\Delta t},$$  Equation 5 and the velocity angle history ($\Phi_V$) in the image frame becomes $$\Phi_V = \tan^{-1}(V_y V_x^{-1})$$  Equation 6.

A linear fit to the $\Phi_V$ is computed for each shot to be used in correcting the pitch angle of the projectile.

Example 2: Pitch and Yaw Correction 120

The value of $\Phi_{obs}$ calculated in the segmentation process is a measure of the projectile's apparent pitch angle in the image frame. When the line of fire (LOF) is not parallel to the image plane (when $\Psi_x \neq 0$) the calculated $\Phi_{obs}$ value is an over-estimate of the actual pitch angle because the projectile appears shorter as illustrated in FIGS. 14 and 15. If a projectile was a two-dimensional (2D) body, then the pitch angle correction for the skew angle is:

$$\Phi' = \Phi_{obs} \cos(\Psi_x)$$  Equation 7

The accuracy of the simple trigonometric correction in Equation 7 was evaluated using Computer Aided Design (CAD) software. A 3D model of a 155 mm-type projectile was oriented to a pitch angle of 10°. Screenshot images were taken at different viewing skew angles ($T_x$) ranging from −50° to 50°. The process was repeated for a pitch angle of 5°. Results showed that the segmentation and pitch measurement algorithm with the correction in Equation 7 was accurate to within 0.0095° per degree. To improve this result even further, the empirical relationship, accurate for both pitch angles to within 0.0001° per degree for all skew angles in the test set, is established as:

$$\Phi' = \Phi_{obs}(\cos(\Psi_x) + 0.0114|\Psi_x|)$$  Equation 8.

These error estimates may not directly correlate to the accuracy of the segmentation algorithm for real projectile video. The resolution of the CAD projectile images provided just over 200 pixels along the axis of the projectile. This number is actually smaller than most frames in a typical launch video, suggesting that the performance could actually be better from real video. The real video, however, may be subject to increased noise, occlusion, glint, and decreased contrast with the background which may hinder the ability of the algorithm to segment the projectile as accurately as it does for the CAD images.

A final correction must also be made because the true pitch angle is measured relative to the velocity vector of the projectile, not the arbitrary horizontal axis of the image frame. A best estimate for the pitch angle relative to the velocity vector in each video frame is computed as:

$$\Phi_{best} = \Phi' - \Phi_V \cos(\Psi_x) \quad \text{Equation 9.}$$

The corrections of operation 120 are applied to the pitch history of operations 116 and 118 to generate a resultant corrected pitch history. The corrected pitch histories resulting from operation 120 are then input to operation 122 in which data obtained from both camera/tracker systems are used to estimate the true pitch and yaw of the projectile.

Example 3: Merging 122

The pitch value estimated at this point ($\Phi_{best}$) is only representative of the pitching motion relative to the velocity vector in the plane that contains the LOF and is perpendicular to the camera location. In order to estimate the conventional pitch ($\alpha$) and yaw ($\beta$) of the projectile in 3D (referred to as angle of attack and side-slip angle in flight mechanics) it is necessary to use two camera/tracker systems located at different positions. To reduce geometric dilution of precision while optimizing the range in which the bullet remains in view, it has been found that locating the cameras about 40 m downrange, and placed 35 m away from the azimuth of fire works well for analyzing 155 mm projectiles at a quadrant elevation of 800 mils (45°) as shown in FIG. 16.

In operation 122, the algorithm to merge the pitch and yaw analysis from opposing cameras begins by taking the pitching motion history ($\Phi_{best}$) and the position estimates from the video analysis of each camera/tracker system, i.e., the corrected pitch histories, together with the geodetics of the gun and camera geometry. The position history estimate from each camera is averaged for all frames and assumed to be located along the line of fire. In each time increment where the projectile was successfully segmented by both cameras, the camera view plane along the LOF and the pointing vector from the projectile location to each camera is calculated as:

$$\vec{N} = \vec{S}_{LoF} \times Cam_{XYZ}, \quad \vec{r} = s_{proj} \vec{S}_{LoF} - Cam_{XYZ} \quad \text{Equation 10.}$$

Here $S_{LOF}$ is the pointing direction of the line of fire, $s_{proj}$ is the downrange distance of the projectile along the line of fire from the position estimate, $Cam_{XYZ}$ is the position of the camera relative to the cannon trunnion using a coordinate system (where the X direction points horizontally down the azimuth of fire, Y points in the crossrange direction, and the Z direction is up). The projectile pointing vector in the camera view plane in XYZ coordinates is then calculated as:

$$\vec{n}_{rot} = {}_{camera}^{XYZ}R\vec{N} \quad \text{Equation 11.}$$

where the rotation matrix $_{camera}^{XYZ}R$ is constructed using a quaternion:

$$Q = [\cos(0.5\psi_{best}) \vec{r}_X \sin(0.5\Phi_{best}) \vec{r}_Y \sin(0.5\Phi_{best}) \vec{r}_Z \sin(0.5\Phi_{best})] \quad \text{Equation 12.}$$

Finally, the attitude vector of the projectile in found according to:

$$\vec{i}_{XYZ} = \vec{n}_{left,rot} \times \vec{n}_{right,rot} \quad \text{Equation 13,}$$

where the subscripts left and right represent the left and right cameras. The true pitch and true yaw values relative to the line of fire are calculated utilizing the corresponding rotation by a QE angle $_{XYZ}^{LOS}R$:

$$\alpha = \tan^{-1}(i_3/i_1), \; \beta = \tan^{-1}(i_2/i_1), \; \vec{i}_{123} = {}_{XYZ}^{LOS}R \vec{i}_{XYZ} \quad \text{Equation 14.}$$

These pitch and yaw results for the projectile are then used in operation 124 to determine an epicyclical motion of the projectile.

Example 4: Epicyclical Motion Calculation 124

In some embodiments, the epicyclic motion of the projectile can also be characterized. In free flight, the nose of a projectile gyrates or "cones" around its velocity vector at two distinct frequencies. The slower of these frequencies is known as precession and the faster frequency is known as nutation. In the short amount of travel captured by the launch video, only 1-2 nutation cycles are measured.

In one embodiment, a three step procedure for quantifying the epicyclic motion assuming linearized aeroballistics is as follows:

1. Subtract the average value for the pitching motion ($\alpha$) from each of the history points calculated, and find a least-squares fit to a single sinusoid featuring a first estimate for the fast frequency ($\omega_f$) and its corresponding phase shift ($\phi_f$)

$$\alpha_{zero\_mean} = \lambda_f \sin(\omega_f t + \phi_f) \quad \text{Equation 15.}$$

2. Assume that velocity (V) and spin rate (p) are constant during the segment of flight recorded in the video. The projectile spin rate is calculated by taking the average velocity calculated in the automated velocity analysis and converting it to spin rate:

$$p = 2\pi \bar{V}(N_{twist} d_{proj})^{-1} \left[\frac{\text{rad}}{\text{sec}}\right], \quad \text{Equation 16}$$

where $d_{proj}$ is the projectile diameter and $N_{twist}$ is the twist rate of the cannon rifling (for U.S. 155 mm cannons $N_{twist}=1$ rev/20 cal).

For axially symmetric spinning projectiles, the relative rates of the fast and slow modes of oscillation are related by the spin rate through the ballistic parameter P:

$$P = I_x I_y^{-1} p, \; \omega_s = P - \omega_f \quad \text{Equation 17,}$$

where $I_x$ and $I_y$ are the axial and transverse moments of inertia of the projectile, respectively.

Using the $\omega_f$, $\lambda_f$, and the $\phi_f$ calculated in step 1, a second least-squares fit is performed to determine an estimate for $\lambda_s$, and the $\phi_s$:

$$\alpha_{true} = \lambda_f \sin(\omega_f t + \phi_f) + \lambda_s \sin((P-\omega_f)t + \phi_s) \quad \text{Equation 18.}$$

3. Perform a final least-squares fit allowing all variables in Equation 18 to adjust to compute the best estimate for the pitching motion. If the epicyclic motion has been correctly identified, then step three can be repeated to fit the yaw-direction data ($\beta_{true}$) by changing only the phase shifts ($\phi_s$ and $\phi_f$) as shown in the following section.

Example 5: Aeroballistic Parameter Calculation 126

Having quantified the epicyclical motion, important aeroballistic information can be determined about the projectile flight. The first value of interest is the ballistic parameter M, which is calculated from:

$$M=0.25(P^2-(2\omega_f-P)^2)$$ Equation 19.

From the parameter M, the linearized pitch damping coefficient, $C_{m\alpha}$ is found as:

$$C_{m\alpha}=2m_{proj}(\rho_{air}S_{proj}d_{proj})^{-1}k_y^2M, k_y^2=I_y(d_{proj}^2 m_{proj})^{-1}$$ Equation 20.

The ratio of these parameters can be used to quantify the gyroscopic stability of the projectile for the given launch velocity:

$$S_g=0.25P^2M^{-1}$$ Equation 21.

Example 6: Computer Simulations and Field Test Results

In testing of the automated method to quantify epicyclic motion, a virtual launch video was generated from a 3D CAD model of an M795 155 mm projectile. The coloring, lighting, and frame rate (10,000 fps) were set to match conditions observed in real launch videos. The commanded motion exhibited roughly 2½ nutation cycles and ½ of a precession cycle in the 1,000 frame video which lasted 3.5 sec (comparable to the cycles observed in a real 0.1 sec launch video).

Several different resolutions were investigated. Estimated values for the oscillation frequencies were calculated to within 0.05% error for pixel resolutions higher better than 112 pixels along the length of the projectile. Errors were significant at lower resolutions where there were only 53 pixels along the projectile length, which may indicate a lower bound of the algorithm. In one instance, the video analysis and post-processing required 55 seconds. The results of this verification study are shown in FIG. 17.

An artillery test of M795 155 mm projectiles was conducted in which two camera/tracker systems were employed to evaluate the proposed method. Over 800 videos were recorded and analyzed. The average computation time was less than 4 minutes for each round (videos recorded at 2,000 fps). The average velocity calculated during this shot was 765.5 m/s. A sample of the output results from one of those rounds is shown in FIGS. 18-20.

As expected, the pitch angle measured by each camera in FIGS. 18-20 begins near zero as the bullet leaves muzzle of the cannon, and then exhibits smoothly fluctuating sinusoidal motion. After converting the estimates from each camera to describe true pitch ($\alpha$) and true yaw ($\beta$), the pointing history is plotted on the right side of FIGS. 18-20 in the convention of Carlucci. The history shows one entire clockwise nutation cycle and also gives an indication of the clockwise processing motion.

Figure 21:
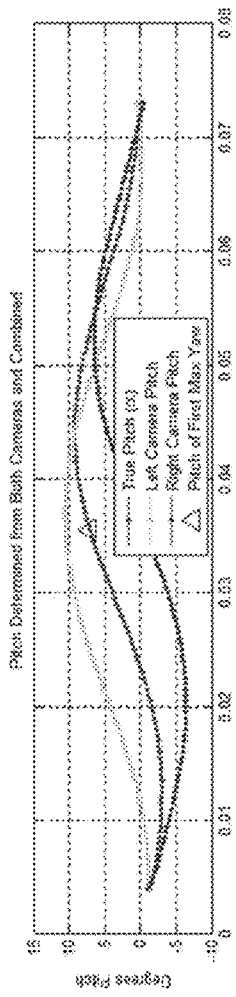
FIG. 21 illustrates pitch determined from both cameras and combined in accordance with one embodiment of the present disclosure.
Figure 22:
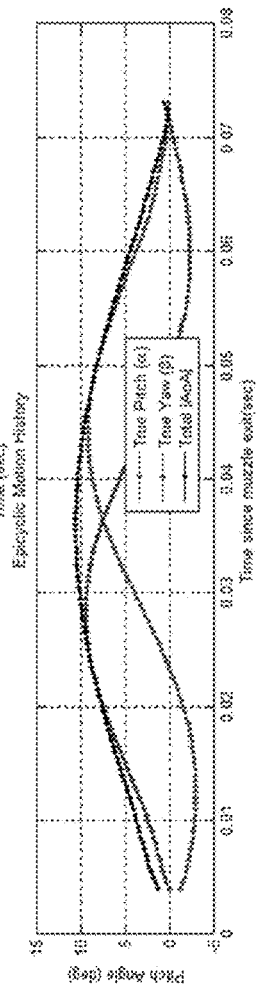
FIG. 22 illustrates epicyclical motion history in accordance with one embodiment of the present disclosure.
Figure 23:
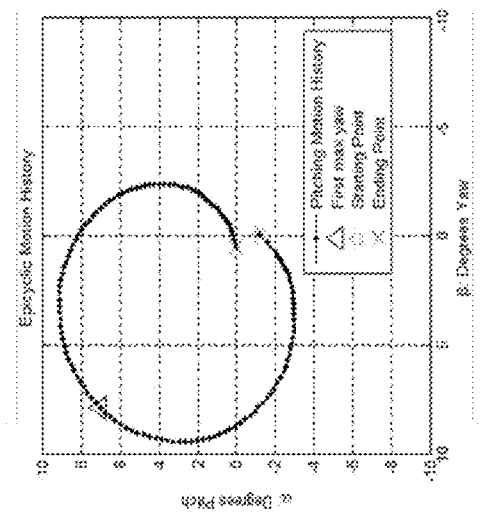
FIG. 23 illustrates epicyclical motion history degrees yaw in accordance with one embodiment of the present disclosure.

FIGS. 21-23 illustrate the results of the automated epicyclic motion calculation for the round analyzed in FIGS. 18 and 19. The estimated oscillation frequency values for the round in FIGS. 21-23 were 17.6 Hz and 4.9 Hz for the nutation and precession rates, respectively. These values are higher than expected, but within the bounds of simulation estimates for the M795 projectile with a spatial angle of attack ($\alpha_{sp}=\sqrt{\alpha^2+\beta^2}$) larger than 5° and occurring in the transonic region Stationary pitch and yaw cameras were also employed during this test. The cameras were oriented to measure the FMY, which was expected to occur around 25 m beyond the muzzle of the cannon. Manual data reduction on the pitch and yaw cameras was received two weeks after the completion of the test. The FMY value determined from the pitch and yaw camera analysis differed from the spatial angle of attack at 25 m measured by the automated method by an average of 0.64° with a standard deviation of 0.55°. These values happen to be within the error bounds of the manual pitch and yaw camera analysis method.

Embodiments in accordance with the present disclosure utilize two camera/tracker systems. The method does not function correctly if the projectile does not remain in view or if the size of the projectile resolution falls below one hundred and twelve pixels along the length of the bullet. Performance is degraded by poor focus of the image and by glint from the sun. In a few cases studied, the image of the projectile disappeared for several frames when the sun was in the background. Horizontal firings where objects appear in the background significantly hinder the segmentation algorithm. There may also be time delay problems between the two camera/tracker systems, or between the time recorded on each frame and the time recorded by the mirror rotation encoder. This would affect how the code is able to synchronize the data streams and compute the attitude vector in 3D.

This disclosure provides exemplary embodiments of the present disclosure. The scope of the present disclosure is not limited by these exemplary embodiments. Numerous variations, whether explicitly provided for by the specification or implied by the specification or not, may be implemented by one of skill in the art in view of this disclosure.

What is claimed is:

1. A computer-implemented method for analyzing a video taken of a projectile launched from a gun, the method comprising:
   receiving a first projectile launch video recording of a projectile launched from a gun generated by a first video camera system, the first projectile launch video having a plurality of first image frames, at least a portion of the plurality of first image frames containing an expected projectile shape;
   receiving a second projectile launch video recording of the projectile launched from the gun generated by a second video camera system, the second video camera system being positioned at a different location from the first video camera system, the second projectile launch video having a plurality of second image frames, at least a portion of the plurality of second image frames containing an expected projectile shape;
   generating a first pitch history by segmenting a projectile shape in each of the first image frames of the plurality of first image frames;
   generating a second pitch history by segmenting a projectile shape in each of the second image frames of the plurality of second image frames;
   generating a first corrected pitch history by receiving first mirror rotation data corresponding with the first projectile launch video, and recording and correcting the first pitch history for skew angle and camera misalignment;
   generating a second corrected pitch history by receiving second minor rotation data corresponding with the second projectile launch video, and recording and correcting the second pitch history for skew angle and camera misalignment;
   receiving geodetic information associated with the location geometry of the first video camera system, the second video camera system, and the gun; and
   estimating the pitch and the yaw of the projectile based on the first corrected pitch history, the second corrected pitch history, and the geodetic information.

2. The method of claim 1, wherein segmenting a projectile shape in each of the first image frames of the plurality of first image frames and segmenting a projectile shape in each of the second image frames of the plurality of second image frames further comprises:

increasing a sensitivity of at least one of the first projectile launch video and the second projectile launch video to find the projectile in the first or second projectile launch video.

3. The method of claim 2, wherein increasing a sensitivity of at least one of the first projectile launch video and the second projectile launch video to find the projectile in the first or second projectile launch video further comprises:

selecting an image frame from the first or second video;
determining whether the selected image frame is a black and white image;
converting the selected image to a black and white image when the selected image frame is not a black and white image;
locating a plurality of edges from the image frame;
dilating the plurality of edges;
connecting at least two of the plurality of the edges adjacent each other to define at least one shape;
eroding a thickness of a boundary of the at least one shape;
removing the at least one shape from a border of the image, the border being defined by the plurality of edges;
selecting a shape from the at least one shape having a largest area of the at least one shape;
determining when a size of the shape with the largest area is greater than or equal to a predefined sensitivity threshold;
analyzing an active shape model of the shape with the largest area when the size of the shape with the largest area is greater than or equal to the predefined sensitivity threshold;
determining when the shape with the largest area is the projectile from the video;
determining the number of reprocessing iterations have occurred when the shape with the largest area is determined not to be the projectile;
increasing the sensitivity of the video when the number of reprocessed iterations of is less than a predefined iteration threshold;
generating a stripe pixel column for the image frame when the shape with the largest area is determined to be the projectile in the video;
determining when the image frame is the last image frame in the first or second video;
extracting at least one column of pixels of the at least one marking from the shapes from the image frame; and
ceasing segmenting a plurality of shapes of the projectile from the first or second video when the number of reprocessing iterations is equal to the predefined iteration threshold.

4. The method of claim 1, further comprising: calculating a velocity vector of the projectile from an orthogonal point and camera sweep plane of the first and second projectile launch videos.

5. The method of claim 4, further comprising: correcting the pitch and yaw estimates with the velocity vector.

6. The method of claim 5, further comprising: merging the corrected pitch and yaw measurements from the first and second pitch histories and position estimates of the first and second cameras.

7. The method of claim 6, further comprising: determining an epicyclical motion of the projectile from the merged pitch and yaw measurements.

8. The method of claim 7, further comprising: determining an aeroballistic parameter from the epicyclical motion of the projectile.

9. A computer program product comprising a non-transitory recording medium storing instruction for performing the method of claim 1, and a processor in communication with the memory that implements the instructions.

10. A system comprising memory storing instructions for performing the method of claim 1, and a processor in communication with the memory which implements the instructions.

11. A system for analyzing a video taken of a projectile launched from a gun, the system comprising: a processor in communication with a memory, and the memory comprising: a receiving module configured to receive a first projectile launch video recording of a projectile launched from a gun generated by a first video camera system, the first projectile launch video having a plurality of first image frames, at least a portion of the plurality of first image frames containing an expected projectile shape; a second projectile launch video recording of the projectile launched from the gun generated by a second video camera system, the second video camera system being positioned at a different location from the first video camera system, the second projectile launch video having a plurality of second image frames, at least a portion of the plurality of second image frames containing an expected projectile shape; and geodetic information associated with the location geometry of the first video camera system, the second video camera system, and the gun; a segmenting module configured to segment a projectile shape in each of the first image frames of the plurality of first image frames to generate a first pitch history, and the second image frames of the plurality of second image frames to generate a second pitch history; a generating module configured to generate: a first corrected pitch history by receiving first mirror rotation data corresponding with the first projectile launch video, and recording and correcting the first pitch history for skew angle and camera misalignment; and a second corrected pitch history by receiving second mirror rotation data corresponding with the second projectile launch video, and recording and correcting the second pitch history for skew angle and camera misalignment; and a pitch and yaw estimating module configured to estimate the pitch and the yaw of the projectile based on the first corrected pitch history, the second corrected pitch history, and the geodetic information.

12. A method of using the system of claim 11 comprising: receiving the first projectile launch video recording, the second projectile launch video recording, and the geodetic information using the receiving module; segmenting the projectile shape in each of the first image frames of the plurality of first image frames to generate the first pitch history, and the second image frames of the plurality of second image frames to generate the second pitch history using the segmenting module; generating the first corrected pitch history and the second corrected pitch history using the generating module; estimating the pitch and the yaw of the projectile based on the first corrected pitch history, the second corrected pitch history, and the geodetic information using the pitch and yaw estimating module; and increasing a sensitivity of at least one of the first projectile launch video and the second projectile launch video to find the projectile in the first or second projectile launch video.

13. The method of claim 12 further comprising: selecting an image frame from the video; determining whether the selected image frame is a black and white image; converting the selected image to a black and white image when the selected image frame is not a black and white image; locating a plurality of edges from the image frame; dilating the plurality of edges; connecting at least two of the plurality of the edges adjacent each other to define at least one shape; eroding a thickness of a boundary of the at least one shape; removing the at least one shape from a border of the image, the border being defined by the plurality of edges; selecting a shape from the at least one shape having a largest area of the at least one shape; determining when a size of the shape with the largest area is greater than or equal to a predefined sensitivity threshold; analyzing an active shape model of the shape with the largest area when the size of the shape with the largest area is greater than or equal to the predefined sensitivity threshold; determining when the shape with the largest area is the projectile from the video; determining the number of reprocessing iterations have occurred when the shape with the largest area is determined not to be the projectile; increasing the sensitivity of the video when the number of reprocessed iterations of is less than a predefined iteration threshold; generating a stripe pixel column for the image frame when the shape with the largest area is determined to be the projectile in the video; determining when the image frame is the last image frame in the video; extracting extract at least one column of pixels of the at least one marking from the shapes from the image frame; and ceasing segmenting a plurality of shapes of the projectile from the video when the number of reprocessing iterations is equal to the predefined iteration threshold.

14. The method of claim 13, further comprising: calculating a velocity vector of the projectile from an orthogonal point and camera sweep plane of the first and second projectile launch videos.

15. The method of claim 14, further comprising: correcting the pitch and yaw estimates with the velocity vector.

16. The method of claim 15, further comprising: merging the corrected pitch and yaw measurements from the first and second pitch histories and position estimates of the first and second cameras.

17. The method of claim 16, further comprising: determining an epicyclical motion of the projectile from the merged pitch and yaw measurements.

18. The method of claim 17, further comprising: determining an aeroballistic parameter from the epicyclical motion of the projectile.

* * * * *